US007797304B2

(12) United States Patent
Muralidhar et al.

(10) Patent No.: US 7,797,304 B2
(45) Date of Patent: Sep. 14, 2010

(54) EXTENSIBLE QUERY LANGUAGE WITH SUPPORT FOR RICH DATA TYPES

(75) Inventors: Subramanian Muralidhar, Bellevue, WA (US); Stephen Frederick Starck, Bothell, WA (US); Sean B. House, Seattle, WA (US); Simon Cavanagh, Redmond, WA (US); Fabio Meireles F. Valbuena, Bellevue, WA (US); Ramesh Nagarajan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 11/507,864

(22) Filed: Aug. 21, 2006

(65) Prior Publication Data

US 2007/0219976 A1  Sep. 20, 2007

Related U.S. Application Data

(60) Provisional application No. 60/784,510, filed on Mar. 20, 2006.

(51) Int. Cl.
G06F 17/30 (2006.01)
(52) U.S. Cl. .................................. 707/713; 707/809
(58) Field of Classification Search .............. 707/1–5, 707/100–104.1, 713, 809
See application file for complete search history.

(56) References Cited

U.S. PATENT DOCUMENTS

| 5,732,258 | A | 3/1998 | Jakobsson et al. | |
|---|---|---|---|---|
| 6,578,046 | B2 * | 6/2003 | Chang et al. | 707/103 R |
| 6,625,593 | B1 * | 9/2003 | Leung et al. | 707/2 |
| 6,643,636 | B1 | 11/2003 | Au et al. | |
| 6,792,420 | B2 * | 9/2004 | Chen et al. | 707/3 |
| 6,795,825 | B2 | 9/2004 | Rishe | 707/10 |
| 7,010,542 | B2 | 3/2006 | Trappen et al. | 707/102 |
| 7,152,062 | B1 * | 12/2006 | Draper et al. | 707/4 |
| 7,526,425 | B2 * | 4/2009 | Marchisio et al. | 704/9 |
| 7,533,087 | B2 * | 5/2009 | Liu et al. | 707/4 |
| 2005/0262135 | A1 | 11/2005 | White | |
| 2006/0179049 | A1 * | 8/2006 | Balmin et al. | 707/4 |
| 2006/0195421 | A1 * | 8/2006 | Kilroy | 707/3 |
| 2006/0200449 | A1 * | 9/2006 | Pauws | 707/3 |
| 2008/0216533 | A1 | 9/2008 | Ellis | |

OTHER PUBLICATIONS

U.S. Appl. No. 11/171,905, filed Jun. 30, 2005, Woodford et al.

* cited by examiner

*Primary Examiner*—Mohammad Ali
*Assistant Examiner*—Huawen Peng
(74) *Attorney, Agent, or Firm*—Woodcock Washburn LLP

(57) ABSTRACT

A query language has support for rich data types. A query language system contains an application configured to generate queries according to the query language. In addition, the system has a platform for handling queries that are generated using the provided query language. The platform contains an object services layer, a map provider layer, and a bridge layer which may ultimately interface with a variety of commercially available databases.

21 Claims, 3 Drawing Sheets

EXTENSIBLE QUERY LANGUAGE WITH SUPPORT FOR RICH DATA TYPES

CROSS-REFERENCE TO RELATED APPLICATIONS

This application claims priority to U.S. Provisional Application No. 60/784,510, filed Mar. 20, 2006.

BACKGROUND

Data has become an important asset in almost every application, whether it is for example a Line-of-Business (LOB) application browsing products and generating orders or a Personal Information Management (PIM) application scheduling a meeting between people. Applications are increasingly becoming data centric—they plan a significant portion of their design- and run-time experience around querying, manipulating, and presenting data. Many of these applications deal with data that is rich in semantics, like structural integrity, data constraints, relationships between data, and so on. Today's applications expend significant effort in procedural code to preserve the data semantics.

Consider, for example, a LOB application. Typically, such an application deals with Customers, Orders, OrderLines, Suppliers, Products, Employees, Shippers, Invoices, and so on. Each of these notions represents a separate rich data type with a specific structure. For example, the Customer type has things like CustomerID, Company Name, Contact Name, and Address; the Order type has things like OrderID, CustomerID, OrderDate, OrderLines, DueDate, etc. Any of the above may have further requirements, for example Address may require a PostalCode which, when within the USA, must be a zip code that is five characters long, and each character is a digit between zero and nine. In Canada, the PostalCode must be of the form "ANA NAN" where A is a letter and N is a number. When modeling postal codes, it is thus not enough to merely specify that it is a string; additional constraints must be placed on this string to restrict the range of possible values that it can take. Furthermore, there are usually relationships among data. For example, an Order may always have a Customer associated with it; this is a many (Order)-to-One (Customer) relationship. Products and Suppliers bear a many-to-many relationship because multiple products can be supplied by a single supplier, and multiple suppliers can carry the same product.

A data model describes the structure and semantics of, and relationships among, the various pieces of data that an application is interested in. While relational models and systems have been very successful in data management, they have failed to capture the application data models. Traditional client-server applications relegate query and persistence operations on their data to database systems. The database system operates on data in the form of rows and tables, while the application operates on data in terms of higher-level programming language constructs such as classes and rich data types. The impedance mismatch in the data manipulation services between the application and the database tier was tolerable in traditional systems. With the advent of service-oriented architectures (SOA), application servers and multi-tier applications, the need for rich data access and manipulation services that are well-integrated with programming environments and can operate in any tier has increased tremendously.

Most applications and application frameworks roll their own data model on top of relational data model based systems to bridge the impedance mismatch between the data and the application programming environment. This is because most applications, whether LOB, PIM, Information Worker, or otherwise, require data model concepts like rich structure, relationships, behaviors, and extensibility. These data model concepts are not adequately supported by existing data models, and moreover adequate query languages do not presently exist for accessing data if it were to be organized according to a more advanced data model.

Exemplary modern candidates for a data meta-model include the 1999 version of the Structured Query Language (SQL99), the Common Language Runtime (CLR), the Unified Modeling Language (UML) and XML Schema Definition (XSD). However, the CLR is an object-oriented, imperative-programming runtime, and has no native data model or notions of integrity constraints, relationships, or persistence. SQL99 lacks data modeling concepts like relationships, and does not have good programming language integration. The XSD specification does not support concepts like keys, relationships, and persistence, and is complex and has awkward mapping to both the runtime and to relational database models. The UML is too general: it requires application developers to add precise semantics, especially for persistence.

There is an unmet need in the industry for a data model and corresponding support framework that provides better application access to rich data types. There is a further need for an extensible query language with support for rich data types as may be supported by such a data model

SUMMARY

In consideration of the above-identified shortcomings of the art, the present invention provides an extensible query language with support for rich data types. Various exemplary features of the provided query language are discussed herein. Furthermore, system may comprise an application configured to generate queries according to the query language. Also provided is a platform for handling queries that are generated according to the provided query language. The platform generally comprises an object services layer, a map provider layer, and a bridge layer which may ultimately interface with a variety of commercially available databases.

BRIEF DESCRIPTION OF THE DRAWINGS

The systems and methods for an extensible query language with support for rich data types in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

First, this description provides an exemplary data model and related data support mechanisms as may be used in exemplary embodiments of systems and methods that incorporate a query language with support for rich data types as described herein. Next, a variety of novel features and aspects of the exemplary query language set forth herein are highlighted and discussed. A detailed specification for an exemplary query language is set forth in Appendix A and extensions thereto is set forth in Appendix B. The detailed implementations include a host of novel and useful features as will be appreciated by those of skill in the art.

Exemplary Data Model and Related Data Support Mechanisms

An exemplary data model and related data support mechanisms may be incorporated into a set of technologies such as the Active X Data Objects for managed code (ADO.NET) platform, which is designed to provide consistent access to data sources such as MICROSOFT® Structured Query Language (SQL) Server, as well as data sources exposed through Object Linking and Embedding for Databases (OLE DB) and Extensible Markup. Language (XML). Data-sharing consumer applications can use ADO.NET to connect to these data sources and retrieve, manipulate, and update data.

ADO.NET cleanly factors data access from data manipulation into discrete components that can be used separately or in tandem. ADO.NET includes .NET Framework data providers for connecting to a database, executing commands, and retrieving results. Those results are either processed directly, or placed in an ADO.NET DataSet object in order to be exposed to the user in an ad-hoc manner, combined with data from multiple sources, or remoted between tiers. The ADO.NET DataSet object can also be used independently of a .NET Framework data provider to manage data local to the application or sourced from XML. Thus, ADO.NET provides functionality to developers writing managed code similar to the functionality provided to native COM developers by the Active X Data Objects (ADO) technology familiar to those of skill in the art.

Figure 1:
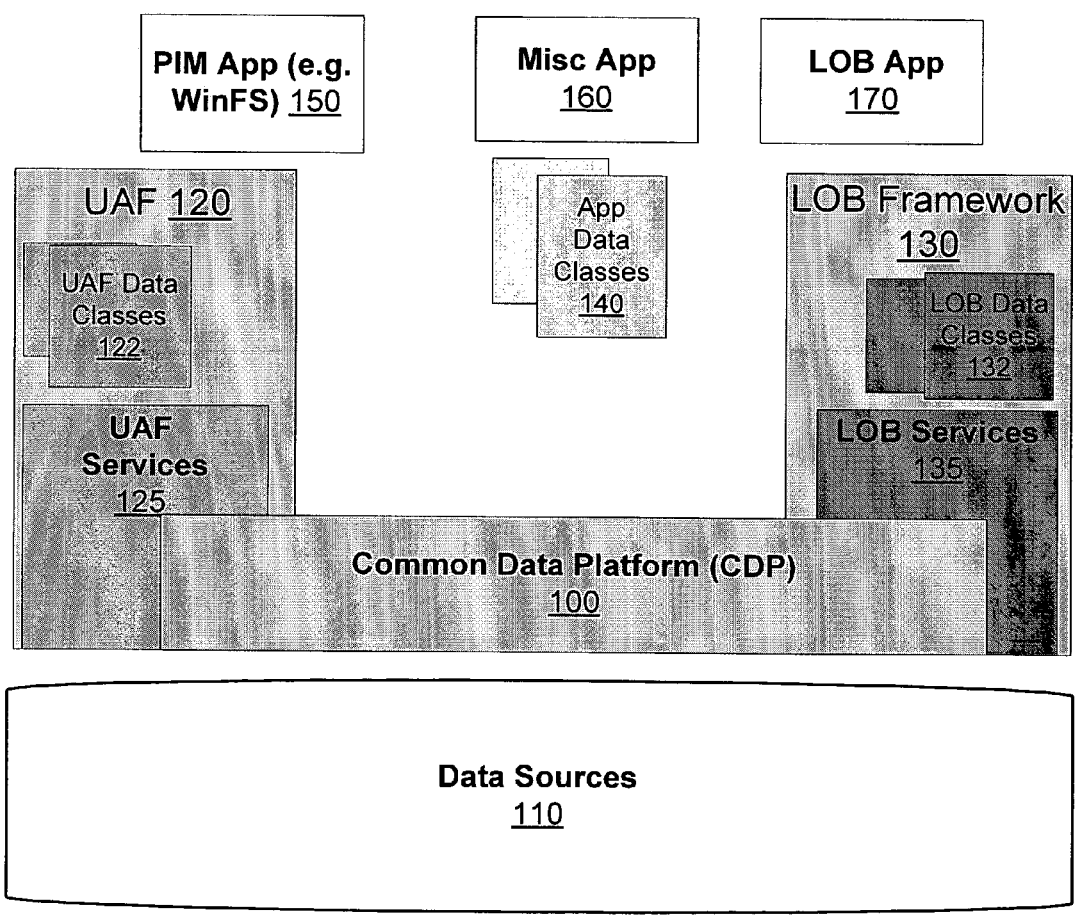
FIG. 1 illustrates an application support architecture for applications accessing data according to the systems and methods provided herein.

In one embodiment, the ADO.Net platform can be extended to provide a rich set of data services for applications—across a variety of application frameworks such as PIM frameworks and LOB frameworks—to access, manipulate and manage data in a fashion that is well integrated with the application programming environment. FIG. 1 illustrates the placement of this functionality in an application support architecture. The Common Data Platform (CDP) 100 may implement a set of technologies such as the ADO.Net platform. The Common Data Platform (CDP) 100 and related technologies are discussed in detail in U.S. patent application Ser. No. 11/171,905.

The application support architecture of FIG. 1 may include, for example, a data source 110 such as a SQL SERVER®, WinFS®, or ORACLE® database; a CDP 100 that provides rich data services for applications and application frameworks; a set of framework services, e.g. UAF 120 and LOB Framework 130 that extend and augment the CDP 100 functionality; a set of data classes, e.g., 122, 132, 140 that encapsulate framework functionality and general application logic; and any number of applications 150, 160, 170 that consume functionality provided by the CDP 100 and frameworks 120, 130 and/or classes 122, 132, 140.

A data model that is supported by the CDP 100 may comprise, for example, the Entity Data Model (EDM) developed by MICROSOFT® Corporation of Redmond, Wash. The EDM extends the relational data model to accommodate multiple application frameworks such as LOB, PIM, Management, and so forth. The EDM defines rich object abstraction for data, models rich semantics such as data relationships, minimizes the mismatch between the application structures and the data model, supports certain application behaviors, supports basic relational concepts, rich types with inheritance, and relationships, and generally provides modeling concepts that capture data semantics independent of the data stores and deployment tiers. The EDM may be incorporated into technologies such as ADO.NET.

Figure 2:
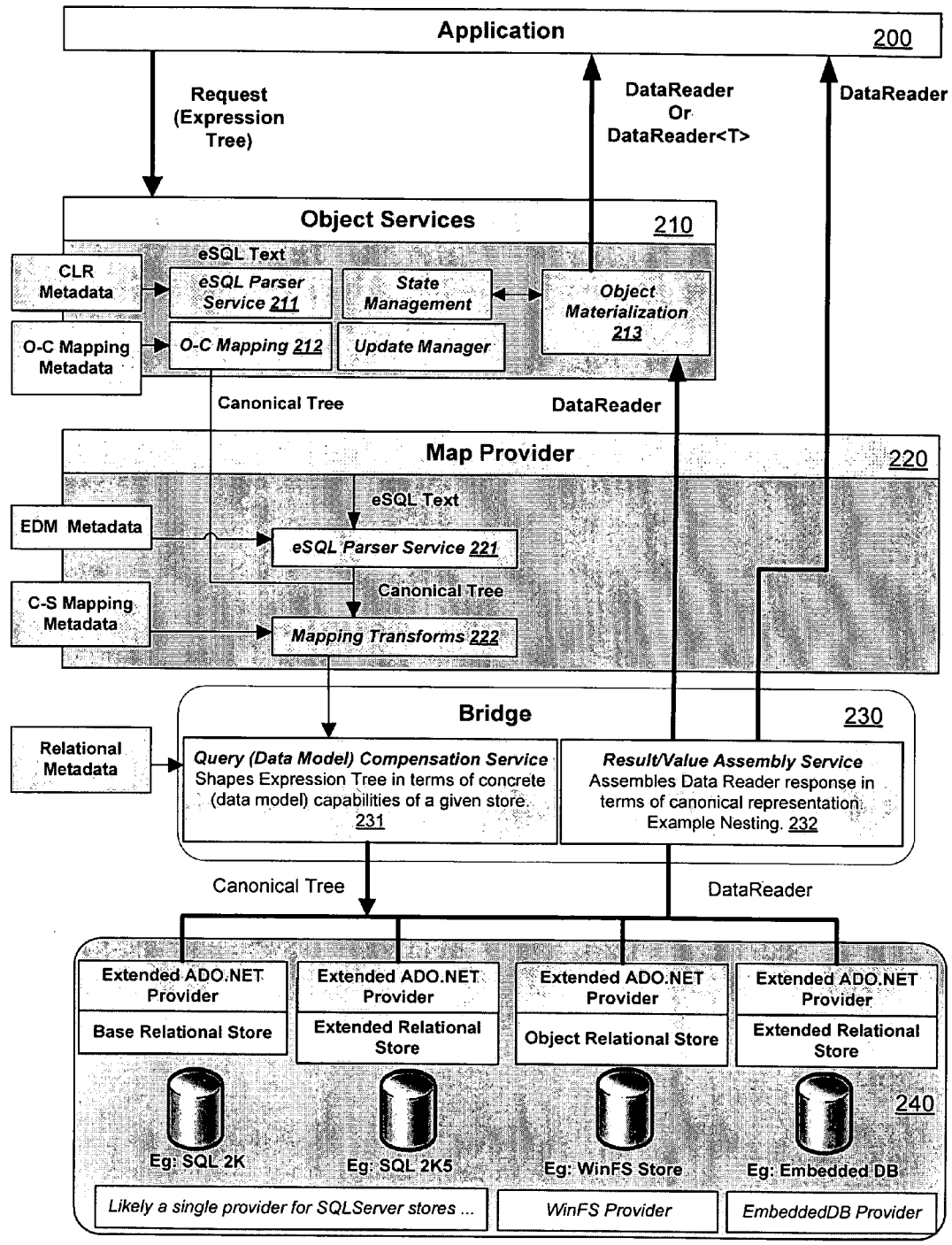
FIG. 2 the main components of a CDP architecture and in particular describes the query pipeline as may be conduct queries made using the extensible query language for rich data types discussed in greater detail below.

FIG. 2 illustrates the main components of the CDP 100 architecture and in particular describes the query pipeline as may be conduct queries made using the extensible query language for rich data types discussed in greater detail below. The term "eSQL" will be used herein to refer to an extensible query language for rich data types, an embodiment of which is set forth in detail below. FIG. 2 also illustrates how a query flows through different components of the CDP 100.

First, an application 200 issues a query against the object services provider 210 as an eSQL query. Object services provider 210 can comprise a parser service 211 that analyzes the query and converts it into a canonical tree, and mapping transforms 212 that perform any mapping translations (from an application data model to an EDM as provided herein) on the canonical tree. The object services provider may than pass the canonical tree down to the map provider 220.

The map provider 220 encapsulates the object relational mapping functionality. It comprises mapping transforms 222 that perform mapping translations on the canonical tree. The map provider passes the canonical tree to the bridge 230 for mediation services.

The bridge 230 can comprise a query compensation services component 231 that factors the canonical tree and performs any data-model compensations, then passes down one or more canonical trees to the storage provider 240.

The storage provider 240 translates the canonical tree into its native dialect, for example, into a SQL dialect such as SQL 2000 or SQL 2005, or a WinFS or embedded database format. The storage provider 240 executes the query, and returns a message, e.g. a message that may be formatted to be passed to or from a DataReader interface (a "DataReader") to bridge 230.

The bridge 230 comprises a result/value assembly service 232 that assembles, if necessary, results from potentially multiple DataReaders returned by the storage provider 240. The result of this operation performed by 232 is a single DataReader in terms of the EDM space.

The map provider 220 next simply returns the DataReader from the bridge 230 to the object services provider 210. The object services 210 translates results from the map provider 220 into object space. Object services provider 221 comprises a component 213 that optionally materializes results as objects, and caches the objects in the identity map. Finally, the application 200 consumes the resulting DataReader.

Turning to several salient aspects of the EDM more specifically, the EDM is generally constructed according to four core concepts: types, instances, entities, and relationships. These concepts can be illustrated using the example of a typical LOB application. Such an application deals with different kinds of data, e.g., order, customer, order lines, address, supplier, product, employee, and so on.

In an exemplary usage of the EDM, Customer data can be considered an entity. An entity represents a top level data unit that an application works with. Customer may have several fields: CustomerID, CompanyName, ContactName, Address, and Phone. Each field has a type, which determines the structure of the data that goes into that field. For example, CustomerID can be a string of a fixed length. CompanyName and ContactName fields may also be of type string. Customer itself also has a type; because Customer is an entity, this type can be referred to as an entity type.

An Address field may be different from the other fields: it possess internal structure in the form of other fields such as City, State, and PostalCode. In EDM, the type of a field such as Address is called complex type. In contrast, the type of CustomerID, CompanyName, and ContactName may all be simple types.

The Phone field may consist of several phone numbers, each of which is a string. This is called a collection type.

The type specifies the structure of data and certain constraints on the values. Actual data is stored in instances of these types. Anybody familiar with object oriented programming will draw the obvious analogy: types and instances are similar to classes and objects respectively.

Both Customer and Address are similar in the sense that they both have internal structure: they are composed of multiple fields. But semantically and operationally, a Customer is different from an Address. Customer acts as the unit for query, data change operations, transactions, persistence, and sharing. An Address on the other hand always lives within a Customer and cannot be referred to or otherwise acted upon independently. In the EDM, we call such top level data units as entities. All other data is considered to be inline to entities.

Now consider exemplary Order data. Business rules may require that every order have a corresponding customer. This is modeled by a relationship between the Order entity and the Customer entity. There are different kinds of relationships supported by the EDM. The one between an Order and a Customer is called as an association. Associations are typically used to model peer-to-peer relationships among entities.

Each order may be composed of several order lines. For example, if you order five books on AMAZON.COM®, then the information about each book is an order line. This is modeled as another kind of relationship, a composition. Each OrderLine within the composition is an entity.

Exemplary Novel Features of eSQL

Next, a variety of novel features and aspects of an exemplary query language are highlighted and discussed. In general, the eSQL language and extensions thereto, as provided below, can be implemented in a system such as that described above with reference to FIGS. 1 and 2, although those of skill in the art will appreciate that various novel systems and methods associated with the exemplary embodiment below may be implemented in other contexts as well.

The eSQL specification set for the below comprises a variety of novel features, which include but are not limited to representing queries and Data Manipulation Language statememts (DMLs—the term "query" as used herein refers to queries and DMLs) in terms of a data modeling language with support for rich data types (a rich data modeling language) such as the EDM, canonical command trees (CTrees) that represent the programmatic way to specify queries and DMLs in terms of a rich data modeling language, bridge functionality that compensates for particular providers by manipulating the canonical queries, use of view unfolding to elegantly unify the OR mapping strategy across all a rich data modeling language semantics with query and updates. And the ability to extend the core query language through extensions that are driven from metadata. In addition, exemplary novel aspects of the eSQL specifications set forth below include the following.

First class support for collections: The exemplary eSQL embodiment provided herein is designed to be similar to SQL, and provide advantages over SQL. In general, early versions of SQL (SQL-92 and earlier) were heavily table-centric. Tables were treated as first-class citizens, and rows/columns were treated as second-class. And of course, there was no notion of collections. SQL-99 and later dialects provide support for collections, but this support has been retrofitted onto SQL-92. Witness for instance, clunky additions like unnest, apply, and the like.

In contrast, in one embodiment, eSQL treats collections as first-class entities. For example, collection expressions are legal in the from clause. There is no need to use unnest syntaxes. "in" and "exists" subqueries have been generalized to handle any collections—a subquery is simply one kind of collection. "e1 in e2" and "exists(e)" are the eSQL constructs to perform these operations. Furthermore, many of the set operations (union, intersect, except) operate on collections. Joins operate on collections as well.

Everything is an expression: Standard SQL has always had a two-level system—subqueries (tables) and expressions (rows, columns). In one embodiment, in order to provide first-class support for collections and nested collections, eSQL adopts a much cleaner model—everything is an expression. For example, the following are all legal eSQL queries:

1+2*3
"abc"
row(1 as a, 2 as b)
{1, 3, 5}
e1 union all e2
distinct(e1)

Uniform treatment of subqueries: Operating from its table-centric view of the world, SQL has typically tended to perform contextual interpretation of subqueries. For example, in SQL, a subquery in the from clause is considered to be a multiset (table), while the same subquery used in the select clause is considered to be a scalar subquery. Along similar lines, a subquery used on the left-side of an in operator is considered to be a scalar subquery, while the right side is expected to be a multiset subquery.

In one embodiment, eSQL eliminates these differences. An expression has an uniform interpretation that does not depend on the context in which it is used. eSQL can consider all subqueries to be multiset subqueries. If a scalar value is desired from the subquery, eSQL can provide the element operator that operates on a collection (in this case, the subquery), and extract the singleton value from the collection.

Avoiding gratuitous implicit coercions: A related side-effect of the problem described above is the notion of implicit conversion of subqueries to scalar values. Specifically, in SQL, a multiset of rows with a single field is implicitly converted into a scalar value whose datatype is that of the field. In contrast, embodiments of eSQL do not support this implicit coercion. eSQL can provide the element operator to extract a singleton value from a collection, and a select value clause to avoid creating a row-wrapper during a query expression.

Select_Value—avoiding the implicit row wrapper: SQL is somewhat ambiguous about the treatment of the result from a query. The select-clause in a SQL subquery implicitly creates a row wrapper around the items in the clause. This, of course, implies that we cannot create collections of scalars or objects—every collection is a collection of rows (with one field, if necessary). SQL fudges around this problem by allowing an implicit coercion between a rowtype with one field, and a singleton value of the same datatype.

In one embodiment, eSQL provides the select value clause to skip the implicit row construction. Only one item may be specified in a select value clause. When such a clause is used, no row wrapper is constructed around the items in the select clause, and a collection of the desired shape may be produced. eSQL also provides the row constructor to construct arbitrary rows. So, a select value row (e1, e2, . . . ) is exactly equivalent to select e1, e2, . . . .

In another embodiment, the semantics of select could avoid the row construction for the single item case, and use the row constructor explicitly if needed. If the select clause contains multiple items, it would continue to behave as in SQL.

An alternate and more elegant approach is to disallow constructs of the form "select e1, e2 from . . . " and instead force people to use "select row(e1, e2) from . . . " always.

Left-correlation and aliasing: In standard SQL, expressions in a given scope (a single clause like select, from etc) cannot reference expressions defined earlier in the same scope. Some dialects of SQL, including T-SQL, do support limited forms of these in the from clause, but the syntax to use such constructs is clunky and requires apply and unnest operations.

In one embodiment, eSQL generalizes left-correlations in the from-clause, and treats them uniformly. Expressions in the from clause can reference earlier definitions (definitions to the left) in the same clause without the need for special syntax. eSQL also imposes additional restrictions on queries involving group-by clauses. Expressions in the select-clause, having-clause etc of such queries may only refer to the group-by keys via their aliases. Constructs like the following—which were legal in SQL—are illegal in eSQL:

select t.x+t.y from T as t group by t.x+t.y

The right way to do this in eSQL is:

select k from T as t group by (t.x+t.y) as k

Referencing columns (properties) of tables (collections): In one embodiment, all column references in eSQL must be qualified with the table alias. The following construct (assuming that "a" is a legal column of table "T") are legal in SQL, but not in eSQL:

select a from T

The eSQL approved form is:

select t.a as a from T as t

Unqualified references suffer from several problems. They may be ambiguous. They suffer from outer/inner capture issues during schema evolution, and besides, they complicate the implementation. Well-designed queries in SQL already use qualified column references to work around these problems. What eSQL does is to simply enforce this guideline, and this does not make the language more complex.

Navigation through objects: SQL uses the "." notation for referencing columns of (a row of) a table. In one embodiment, eSQL extends this notation (again borrowed heavily from programming languages) to support navigation through properties of an object. For example, if "p" is an expression of type Person:

p.Address.City is the eSQL syntax for referencing the city of the address of this person. Many dialects of SQL already support this syntax.

Navigation through collections: SQL does not provide an easy mechanism to navigate through nested collections. In one embodiment, eSQL provides syntactic shortcuts to handle these cases. The .. operator in eSQL allows projection of an expression from a collection. For example, "a..b" is really syntactic sugar for "select value t.b from a as t". Similarly, "a..b..(c*2)" is syntactic sugar for "select value t2.c*2 from a as t1, t1.b as t2"

The ".?" operator in eSQL allows users to prune elements from a collection. This is similar to the "[ ]" operator in XPath. A construct of the form "a.?p" is really a shortcut for "select value t from a as t where p". For example, "p.?(id=1)" really means "select value p0 from p as p0 where p0.id=1"

When working with inheritance, it is often useful to be able to select out instances of a subtype from a collection of supertype instances. The oftype operator in eSQL (similar to oftype in C# Sequences) provides this capability. Logically, oftype(c, T) is equivalent to "select value treat(x as T) from c as x where x is of T"

Doing away with the *: SQL supports the unqualified * syntax as an alias for the entire row, and the qualified * syntax (t.*) as a shortcut for the fields of that table. In addition, SQL allows for a special count(*) aggregate, that includes nulls. Well-designed queries in SQL do not use such syntaxes (at least, the "select *" and "select t.*" variants). Using "*" is dangerous in the presence of schema evolution. Part of the problem is that SQL had no way for users to select out entire rows.

In one embodiment, eSQL does not support the "*" construct. SQL queries of the form "select * from T" and "select T1.* from T1, T2 . . . " can be expressed in eSQL as "select value t from T as t" and "select value t1 from T1 as t1, T2 as t2 . . . " respectively. Additionally, these constructs handle inheritance (value substitutability) gracefully, while the "select *" variants are restricted to top-level properties of the declared type. Embodiments of eSQL do not support the count(*) aggregate either. Instead, it supports the count (group) construct to handle this case.

Changes to group by: As described earlier, in one embodiment, eSQL supports aliasing of group-by keys, and left-correlations among these keys. In fact, expressions in the select-clause and having clause must refer to the group by keys via these aliases. The group-by clause implicitly produces a nest aggregate for each group-by partition—this expression is referred to as "group". Aggregate functions in the select-list etc. should refer to this expression to perform aggregation. For example:

select k1, count(group), sum(group..(t.a))

from T as t group by t.b+t.c as k1 is the eSQL syntax for the following SQL query:

select b+c, count(*), sum(a)

from T group by b+c

Collection-based aggregates: SQL aggregates are difficult to understand. In one embodiment, eSQL supports two kinds of aggregates. Collection-based aggregates operate on collections, and produce the aggregated result. These can appear anywhere in the query, and do not require the need for a group-by clause. For example, the following eSQL query is legal:

select t.a as a, count({1,2,3}) as b from T as t

In embodiment, eSQL also supports SQL-style aggregates, and implicitly converts them into collection-based aggregates (based on the "group" collection). For example, the following query in eSQL is legal:

select a, sum(t.b) from T as t group by t.a as a;

and is internally translated into a query of the form:

select a, sum(group..(t.b)) as b from T as t group by t.a as a;

In one embodiment, eSQL does not support the count(*) aggregate. Use the count(group) construct instead.

Insert: In one embodiment, eSQL's INSERT..VALUES statement different from T-SQL. Unlike T-SQL, eSQL does not allow a column list to be specified in an insert. There are two reasons for this. Firstly, the EDM has no concept of default values for columns; secondly, the column list approach does not lend itself well to handling of inheritance (value substitutability).

Delete, Update: Unlike T-SQL, in one embodiment, eSQL does not allow an additional from clause in delete and update statements. For delete statements, this does not present a problem, since the query can be written with a subquery. For update statements, however, the additional from clause also helps in producing new values to be used in the Set clause.

Lifted properties and methods: The WINDOWS® Query Language (WinQL) allows navigation through collections via the "." operator, if the collection itself does not have a property of the same name. WinQL also allows for filtering out elements of a collection via the "[ ]" construct—similar to OPath. In one embodiment, eSQL uses the ".." and the ".?" operator for this purpose. Again, schema evolution (and inner capture) is the main reason that eSQL chooses to distinguish between collection navigation and object navigation. And eSQL deliberately avoids the use of "[ ]" for predicates to avoid ambiguity issues.

Order-by semantics: WinQL specifies that the order by clause is processed before the select clause. This is different from SQL where the order by clause is logically processed after the select clause. In one embodiment, eSQL may be closer to SQL in this regard, while WinQL takes a more XQuery-like approach. Either approach is reasonable, and in some ways, the WinQL model is nicer; however, the WinQL approach may not be sufficiently better to justify a change in behavior for SQL users.

SQL-92 actually constrains the order by clause to only contain references to items in the select clause. Most implementations allow the order by clause to reference other items that are in scope currently. In one embodiment, eSQL may follow the latter style.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

APPENDIX A

Detailed Specification for Exemplary Query Language

The following is an exemplary, not limiting specification for an exemplary query language as contemplated herein. Following the below specification is an exemplary specification for extensions to such a query language.

1 Functional Abstract 1.1 Problem Space Description

The CDP provides an object relational mapping infrastructure that may be consumed by applications and frameworks. WinFS provides an integrated storage experience for a wide variety of desktop applications. Both WinFS and the CDP are built on top of the Entity Data Model (EDM). The EDM is an extended relational data model that supports basic relational concepts, rich types with inheritance, and relationships. Users need the ability to issue rich queries against their data expressed in terms of the EDM.

While SQL has historically been the query language of choice for database access, it suffers from many shortcomings. Lack of support for rich types, non-orthogonal constructs etc. are just a few of these. eSQL attempts to address many of these problems with SQL. eSQL is designed to be similar to SQL, and provide some additional infrastructure and improvements upon SQL.

Both WinFS and the CDP leverage existing .NET data access technologies—ADO .NET—to access and manipulate data. A .NET Data Provider provides a somewhat uniform way to access data from any data source via Connections, Commands, DataReaders and other such objects. Commands to a .NET Data Provider are expressed as strings, and must be in the native dialect of the provider (more specifically, the data source that is fronted by the provider). As part of the CDP/WinFS efforts, three new providers—the Object Provider, the EDM Provider, and the WinFS Provider—will be supplied, and all of these will use eSQL as the native dialect.

2 Overview and Design Principles 2.1 Design Principles

First-Class Support for Collections and Objects.

eSQL must make it easy for users to query seamlessly over their objects and collections.

Orthogonality

Constructs in eSQL must be orthogonal. There shall be no contextual interpretations on the use of a given construct.

Composability

Constructs in eSQL must be composable within other constructs.

Similarity to SQL eSQL should remain a SQL-like language as far as possible. Unless the deviation from SQL is necessary (for example, when required by the reasoning above), eSQL should maintain fidelity with SQL constructs.

3 Language Overview eSQL includes the notion of an expression. An expression, as in other programming languages, is a construct that can be evaluated to produce a value. An eSQL query is any legal expression. eSQL provides the following kinds of expressions.

3.1 Literals

A literal, as in most programming languages, is simply a constant value. eSQL provides native support for string and numeric literals, and the special null literal (which has a free-floating datatype).

3.2 Parameters

Parameters in eSQL allow expressions (and queries) to reference values defined outside the query.

3.3 Variable References

Variable references in eSQL allow expressions to refer to other expressions that have been defined (and named) earlier on in the same scope.

3.4 Builtin Operators eSQL provides a small set of built-in operators. This includes arithmetic operators like +,−,*,/, comparison operators (<, >, ..), logical operators (and, or, not etc.), and a few miscellaneous operators (case, between etc.).

3.5 Functions eSQL does not define any built in functions of its own. eSQL function expressions allow the use of any user-defined function (that is visible to eSQL).

3.6 Object Navigation, Methods

These eSQL expressions allow object properties and methods to be referenced and manipulated naturally.

3.7 Aggregate Functions

Aggregate functions in eSQL, like their SQL counterparts, allow folding operations on collections. eSQL supports a nest aggregate, and any user-defined aggregate. eSQL aggregate functions are collection-based in that they may be used anywhere in an expression. eSQL also supports SQL-like group-based aggregates that are only usable in query expressions.

3.8 Constructors eSQL provides three kinds of constructors. Row constructors can be used to create an anonymous, structurally-typed (record) value. Object constructors (constructors in C# etc) can be used to construct (named) user-defined objects. Multiset constructors can be used to construct multisets of other values.

3.9 Type Operations eSQL provides operations that allow the type of an expression (value) to be queried and manipulated. This includes interrogation operations like is of (similar to the is expression in C#), subtype-supertype casts like treat (the as expression in C#) and oftype (the OfType method in C# Sequences), and conversions operators like cast.

3.10 Set Operators eSQL provides a rich set of set operations. This includes SQL-like set operators like union, intersect, except and exists. In addition, eSQL supports operators for duplicate elimination (distinct), membership testing (in), joins (join).

3.11 Query Expressions

Query expressions represent classical SQL select-from-where— . . . queries.

4 Language Details—eSQL Expressions

4.1 Literals

Null

The null literal is used to represent the value null for any type. A null literal is considered to be free-floating (i.e.) it is compatible with any type. Typed nulls can be created via a Cast operator over a null literal:

select Foo(null, v.a+v.b) from values as v—regular null literal select cast (null as Int16) from values as v—typed null See Section 9.6 for rules on where free floating null literals may be used.

Boolean

Boolean literals are represented by the keywords true and false.

Integer (Int32, Int64)

Integer literals may be of type Int32 or Int64. An Int32 literal is a series of numeric characters. An Int64 literal is series of numeric characters followed by an uppercase L.

Decimal

A fixed-point number (decimal) is a series of numeric characters, a period '.' and another series of numeric characters followed by an uppercase M.

Float, Double

A double-precision floating point number is a series of numeric characters, a period '.' and another series of numeric characters possibly followed by an exponent. A single-precisions floating point number (or float) is a double-precision floating point number syntax followed by the lowercase f.

String

A string is a series of characters enclosed in quote marks. Quotes may be either both single-quotes (') or both double-quotes ("). Quoted identifiers may be represented either with [ ] or " ". By default, only the [ ] style is allowed, and " " constructs are treated as string literals. The eSQL parser may allow " " style quoted identifiers (that will be controlled by parser options—beyond the scope of this document); in that case, string literals may only use single quotes. See Section 9.1.2 for more information on this:

'hello'
    "x"
    "This is a string!"
    'so is THIS'

Other Literals eSQL does not support literals of other datatypes natively (DateTime, Guid etc.)

4.2 Parameters

Parameters are variables that are defined outside the query language, usually via a binding API used by a host language. Each parameter has a name and a type. Parameter names are described with the '@' symbol as a prefix before the name in order to disambiguate them from the names of properties or other names defined within the query. The host-language binding API provides APIs for binding parameters. The following example shows the use of a parameter in an expression:

select c from customers as c where c.Name=@name

4.3 Variable

A Variable expression is a reference to a (named) expression defined earlier in the current scope. A variable reference must be a valid identifier as defined in 6. The following example shows the use of a variable in an expression:

select c from customers as c

4.4 Builtin Operators eSQL provides a number of builtin operators, as follows.

4.4.1 Arithmetic

| Operation | Symbol |
| --- | --- |
| Addition | + |
| Subtraction | − |
| Multiplication | * |
| Division | / |
| Modulo | % |
| Negation | − |

Arithmetic operators are defined for numeric primitives such as Int32, Int16, Int64, Double, Single, and Decimal. For binary operators, implicit type promotion occurs for the operands before the operator is applied. The result types of all arithmetic operators are the same as the promoted operand types. Addition is also defined for string and acts as concatenation.

| Operation | Symbol |
|---|---|
| Equality | = |
| Inequality | <>, != |
| Less than | < |
| Less than or equal | <= |
| Greater than | > |
| Greater than or equal | >= |

Comparison operators are defined for numeric primitives such as Byte, Int32, Int16, Int64, Double, Single and Decimal; String and Date Time. Implicit type promotion occurs for the operands before the comparison operator is applied. Comparison operators always yield Boolean.

Equality and inequality are defined for the Boolean type and any object type that has identity. Non-primitive objects with identity are considered equal if they share the same identity.

4.4.3 Logical

| Operation | Symbol | Synonym |
|---|---|---|
| And | and | && |
| Or | or | \|\| |
| Not | not | ! |

Logical operators are defined for Boolean types only—and always return a Boolean type.

4.4.4 Case

The case expression has similar semantics to the TSQL case expression. The case expression is used to make a series of conditional tests to determine which expression will yield the appropriate result.

If b1, b2, . . . , bn–1 are expressions of type Boolean and e1, e2, . . . , en are expressions of some type S, then the following expression is a valid case expression that yields a single value of type S.

case
when b1 then e1
when b2 then e2
. . .
[else vn]
end

This form of the case expression applies a series of one or more Boolean expression to determine the correct resulting expression. The first when-expression to evaluate to the value true yields the corresponding then-expression. The remaining expressions are not evaluated. If none of the when conditions are satisfied, the result is the result of evaluating the else-expression (if one exists), or null (if there is no else-expression). Note, implicit type promotion may occur between different result expressions (e1, e2, . . . en, vn) to determine the actual result type of the case expression.

4.4.5 Between

The between expression has the same semantics as the SQL between expression. It determines whether a given expression results in a value between a lower bound and an upper bound:

e1 between e2 and e3

If e1, e2 and e3 are all expressions of some type T, then the above expression is a valid between-operator expression. The between expression is an abbreviation of writing two comparison operators over the same value. The between syntax is handy if e1 is a complex expression:

e1>=e2 and 1<=e3

The not-between expression may be used to indicate the inverse of the between expression:

e1 not between e2 and e3
e1<e2 or 1>e3

4.4.6 Like

The like-expression has the same semantics as described for TSQL. It determines if a string matches a pattern, resolving to true if the string matches and false if it does not. If match, pattern and escape are all expressions having type String, then the following are valid like-expressions that yield a Boolean value:

match like pattern match not like pattern match like pattern escape escape match not like pattern escape escape The pattern string syntax is the same as the TSQL pattern string syntax.

4.4.7 Null Test (is Null)

The is-null-operator is used to determine if an expression results in the value null. If the expression results in the value null the expression results in the value true. Otherwise the expression results in the value false. If e is an expression that, the following expressions are valid expressions that yield a Boolean:

e is null e is not null

Use the is-null-operator to determine if the element of an outer join is not null:
  select c from cs as c left outer join as ds d
  where d is not null and d.x=@x Use the is-null-operator to determine if a member has an actual value or not:
  select c from cs as c where c.x is not null

4.5 Member Access

Member access is also commonly known as the dot-operator. Use the member access operator to yield the value of a property or field of an object instance. If m is a member of type T that has type M, and t is an instance of type T, then t.m is a legal member access expression that yields a value of type M:
  select p.Name.FirstName from Person as p;

4.6 Method Invocation

Method invocation is an explicit call to a method. It yields the result of the method call. Methods may be instance methods of a type, static methods of a type, or global static methods (ie) standalone function.

If m is a method of type T that returns type M and has parameters of types (P1, P2, . . . , Pn), and t is an instance of type T and e1 is an expression of type P1 and so on, then t.m(e1, e2, . . . , en) is a valid method invocation that yields a value of type M.

If m is a method of type T that returns type M and has parameters of types (P1, P2, . . . , Pn), and qn is a qualified name that refers to type T and e1 is an expression of type P1 and so on, then qn.m(e1, e2, . . . , en) is a valid static method invocation that yields a value of type M.

If m is a method T that returns type M and has parameters of types (P1, P2, ..., Pn), and qn is a qualified name that refers to the namespace prefix of the method, and e1 is an expression of type P1 and so on, then qn.m(e1, e2, ..., en) is a valid static method invocation that yields a value of type M.

An example of a method invocation that could appear in a eSQL query might be the use of methods built-in to primitive data types:

select tsql.substring(c.Name, 0, 2) from customers c

4.6.1 Overload Resolution

More than one method may be defined with the same name. In order to determine which method is referenced by a given expression, follow these rules. The first rule applied in succession that yields only a single method is the resolved method.

1. A method with the same number of parameters exists.
2. A method where each argument type exactly matches the parameter type or is the null literal.
3. A method where each argument type exactly matches or is a sub type of the parameter type or the argument is the null literal. The method with the least number of sub-type conversions wins.
4. A method where each argument type exactly matches, is a sub type of, or can be promoted to the parameter type or the argument is the null literal. The method with the least number of sub-type conversions and promotions wins.
5. The method invocation expression is ambiguous Note, that even if a single method can be extracted using these rules, the arguments still may not match the parameters. If this is the case, then the arguments are in error.

4.7 Enums

Enums are strongly typed integral numeric values that are referred to by name. An enum is specified using a qualified name to refer to the enum's type followed by a dot-operator and the name of the enum. If qn is the qualified name for some enum E, and en is the name of a value of the enumeration, then qn.en is a valid enum reference:

Color.Red

4.8 Type Operations eSQL provides a number of operations to work with types of expression values.

4.8.1 Is Of

The Is of expression checks to see if an expression is an instance of a specified type.

e is of (T)
   e is not of (T)
   e is of (only T)
   e is not of (only T)

If e is of some compile-time type S, and S is either a subtype/supertype of T, then the expressions above are valid expressions, and return a result of type Boolean. If the type of e is determined at runtime to be T (or some subtype of T), then e is of T returns True. If e is null at runtime, this expression returns null; otherwise the result of this expression is False. If the only modifier is specified, then the expression returns true only if e was exactly of type T, and not any of its subtypes. The expressions e is not of (T) and e is not of (only T) are syntactically equivalent to not (e is of (T)), and not(e is of (only T)) respectively. If S is neither a subtype or a supertype of T, then this expression raises a compile-time error.

4.8.1.1 Treat

The treat expression attempts to retype a given expression in terms of a supertype/subtype:

treat (e as T)

If e has type S and T is a subtype of S or S is a subtype of T, then the above expression is a valid treat expression and yields a value of type T. If nether S or T is a subtype of the other, the expression results in a compile time error. If e has type Employee and Manager is a subtype of Employee then the following expression yields the same value of e, but typed as Manager instead of Employee:

treat (e as Manager)

If the value of e is not actually of type Manager, then the expression yields the value null.

4.8.1.2 Cast

The cast expression has similar semantics to the TSQL convert expression. The cast expression is used to convert a value of one type into a value of another type. Only certain type conversions are supported by the language:

cast(e as T)

If e is of some type S and S is convertible to T then the above expression is a valid cast expression. T must be a primitive (scalar type). The use of a cast expression is considered an explicit conversion. Explicit conversions may truncate data or lose precision. The list of valid casts supported by eSQL is described in Section 10.5

4.8.1.3 OfType

A OfType expression specifies a type expression that is issued to perform a type test against each element of a collection. The OfType expression produces a new collection of the specified type containing only those elements that were either equivalent to that type or a sub-type of it.

If ts is a collection of type collection<S> and T is a subtype of S, then OfType(ts, T) is an expression of type collection <T> that yields a collection of all the elements e of ts where the individual type of e, Te, is a subtype of T. An OfType expression is an abbreviation of the following query expression:

select value treat (t as T) from ts as t where t is of T

Given that a Manager is a subtype of Employee, the following expression produces a collection of only managers from a collection of employees:

OfType (employees, Manager)

It is also possible to up cast a collection using the type filter:

OfType(executives, Manager)

Since all executives are managers, the resulting collection still contains all the original executives, though the collection is now typed as a collection of managers. It is not possible to make a known illegal type cast. The following expression will raise a compile-time error. (Assuming of course, that Address is not a subtype/supertype of Employee):

OfType(employees, Address)

4.9 References eSQL supports the following operators for references.

4.9.1 Ref

The Ref operator when applied to the correlation variable for an entityset produces a reference to an entity from that collection. For example, the following query returns references to each Order:

select ref(o) from Orders as o

The following are illegal usages of the ref operator—the correlation variable must resolve to an entity set in the current scope:

select ref(o) from (select value o from Orders as o) as o

4.9.2 CreateRef

The CreateRef operator can be used to fabricate references to an entity in an entityset. The first argument to the operator is the entityset identifier (not a string literal), and the second argument is a record-typed expression that corresponds to the key properties of the entity type:

select ref(BadOrders, row(o.Id)) from Orders as o

The record typed expression must be structurally equivalent to the key type for the entity (ie) it must have the same number and types of fields in the same order as the entity keys—the names of the fields are irrelevant.

4.9.3 Key

The Key operator is the inverse of the CreateRef operator, and can be used to extract the key portion of an expression with type ref. The return type of the Key operator is a record type—with one field for each key of the entity, and in the same order:

select key(ref(BadOrders, row(o.Id))) from Orders as o

4.9.4 Deref

The Deref operator dereferences a reference value, and produces the result of that dereference:

select deref(o.CustRef) from Orders as o

If r is a reference of type ref<T>, then Deref(r) is an expression of type T that yields the entity referenced by r. If the reference value is null, or is dangling (ie) the target of the reference does not exist, the result of the Deref operator is null.

4.9.5 Attribute Dereferencing

You can navigate through a reference via the "." operator.

The following snippet extracts the Id property (of Customer) by navigating through the CustRef property:

select o.CustRef.Id from Orders as o

If the reference value is null, or is dangling (i.e.) the target of the reference does not exist, the result is null.

4.10 Constructors eSQL provides 3 kinds of constructors—row constructors, object constructors and multiset constructors.

4.10.1 Row Constructors

Row constructors can be used to construct an anonymous, structurally typed record from one or more values. The result type of a row constructor is a row typ—whose field types correspond to the types of the values used to construct the row. For example, the expression below:

row(1 as a, "abc" as b, a+34 as c)

produces a value of type Record(a int, b string, c int).

All expressions in the row constructor must be aliased—if no alias is provided, then eSQL attempts to generate an alias via the aliasing rules specified in 0. Expressions in the row constructor may not refer to aliases defined earlier (to the left) in the same constructor. It is illegal for two expressions in the same row constructor to have the same alias. The dot (.) operator may be used to extract fields from a record (similar to extracting properties of an object).

4.10.2 NamedTime Constructors (NamedType Initializers)

eSQL allows named type constructors (initializers) to be used to create instances of named complextypes and/or entity types. The expression below creates an instance of a Person type (assuming that the Person type has those two attributes):

person("abc", 12)

The arguments to the constructor are assumed to be in the same order as the declaration of the attributes of the type.

4.10.3 Collection Constructors

The multiset constructor creates an instance of a multiset from a list of values. All the values in the constructor must be of mutually compatible type T, and the constructor produces a collection of type Multiset<T>. The expressions below creates a multiset of integers:

multiset(1, 2, 3)

{1, 2, 3}

4.11 Set Operations

This section contains a variety of set operators.

4.11.1 Distinct

The distinct expression is used to convert a collection of objects into a set by yielding a new collection with all duplicate references removed. If c is a collection of type collection<T> then distinct(c) is a valid distinct expression that yields a collection of type collection<T> that has no duplicates. The type T must be equal-comparable. The distinct expression is an abbreviation of a select expression:

distinct (c)→select value distinct c from c

4.11.2 Flatten

The flatten expression is used to convert a collection of collections into a flattened collection with all the same elements, just without the nested structure. If c is a collection of type collection<collection<T>> then flatten(c) is a valid flatten expression that yields a new collection of type collection<T>. The flatten expression is an abbreviation of using the select expression:

flatten(c)→select value c2 from c as c1, c1.i as c2

4.11.3 Exists

The exists-expression has the same semantics as the TSQL exists-expression. It determines if a collection is empty or not. If the collection is not empty, the exists-expression return true, otherwise it return false. If c is a collection of type Collection<T>, then exists(c) is a valid exists expression yielding a single value of type Boolean.

4.11.4 In

The in-operator is used to test a value for membership in a collection. The value of the expression on the left hand side of the 'in' keyword is searched for in the collection represented by the expression on the right hand side. If e is an expression with type T and ts is a collection with type Collection<S>, and S and T have a supertype/subtype relationship, then the following expressions are valid in-operator expressions:

e in ts e not in ts

In the following example, the name "Bob" is searched for in the set of customer names:

'Bob' in customerNames

If the value is found to be in the collection, the in-operator yields the value true. If the value is null or the collection is null, the in-operator yields the value null. Otherwise, the in-operator yields the value false. The not form of the operator yields the opposite.

4.11.5 Union, Union All

The union and union all expressions in eSQL have the same semantics as their TSQL equivalents. UnionAll produces a collection that contains the combined contents of the two collections (with duplicates). Union produces a collection with duplicates removed.

If c1 is a collection of type Collection<T>, and c2 is a collection of type Collection<S>, where M is the common supertype of T and S, then c1 union c2 and c1 union all c2 are valid union expressions yielding a collection of type Collection<M>.

The following example identifies the set of all customers who either live in Washington, or are good customers. The first expression eliminates any duplicates (for example, a good customer who also lives in Washington), while the second expression preserves all duplicates:

goodCustomers union WashingtonCustomers
goodCustomers union all WashingtonCustomers

4.11.6 Intersect

The Intersect-expression has the same semantics as the TSQL intersect-expression. It determines the intersection of two collections. If c1 is a collection of type Collection<T>, and c2 is a collection of type Collection <S>, where M is the common supertype of T and S, then c1 intersect c2 is a valid intersect expression yielding a collection of type Collection<M>. The following example identifies the set of all customers who live in Washington and are good customers:

goodCustomers intersect WashingtonCustomers

4.11.7 Except

The Except-expression has the same semantics as the TSQL except-expression. It determines the one-way difference of two collections. If c1 is a collection of type Collection<T>, and c2 is a collection of type Collection <S>, where M is the common supertype of T and S, then c1 except c2 is a valid except expression yielding a collection of type Collection<T>. In the following example, the set of all customers who are not bad customers is identified:

allCustomers except badCustomers

4.11.8 Overlaps

The overlaps expression determines if two collections have a common member. If c1 is a collection of type Collection<T>, and c2 is a collection of type Collection<S>, where M is the common supertype of T and S, then c1 overlaps c2 is a valid overlaps expression yielding a result of type Boolean. The following example checks if any Washington customer is a good customer:

WashingtonCustomers overlaps goodCustomers and is syntactic shortcut for:

exists(WashingtonCustomers intersect goodCustomers)

4.11.9 Element

The element expression extracts the element from a singleton collection. If c is a collection of type Collection<T>, then element(c) is a valid element expression yielding an instance of type T. The following example attempts to extract the singleton element from a set of bad customers:

element (badCustomers)

If the collection is empty, or has more than one element, then the element expression returns a null.

4.12 Collection Navigation eSQL provides a number of syntactic constructs that allow for easier handling of collections.

4.12.1 Projection

The .. (collection-project) operator is used to project out elements through a collection. If c is a collection of type Collection<T>, and p is a property of T with type Q, then c..p produces a collection of type Collection<Q>. More generally, if c is a collection of type Collection<T>, and e is some expression of type Q, then c..e produces a collection of type Collection<Q> containing the result of evaluating e for each element of c. The following example gets the upper-cased names of all departments:

Departments..(upper(name))

and is a shortcut for the following query:

select value upper(d.name) from Departments as d

4.12.2 Filtering

The .? (collection-filter) operator is used to filter out elements from a collection. If c is a collection of type Collection<T>, and e is a boolean expression with type Q, then c.?e produces a collection of type Collection<T> containing only those elements of c that satisfied the predicate e. The following example gets the set of all departments that are based in Seattle:

Departments.?(location='Seattle')

and is a shortcut for the following query:

select value d from Departments as d where d.location='Seattle'

4.12.3 Flattened Projection

The . . . (flattened collection-project) operator is used to project out elements through a nested collection. More generally, if c is a collection of type Collection<Collection<T>>, and e is some expression of type Q, then c . . . e produces a collection of type Collection <Q> containing the result of first flattening c, and then evaluating e for each element of c. The following example gets the upper-cased names of all employees, assuming that Employees is a set-valued property of Department:

Departments.Employees . . . (upper(Name))

and is a shortcut for the following query:

select value upper(e.name) from Departments as d, d.Employees as e

4.12.4 Flattened Filtering

The ..? (flattened collection-filter) operator is used to filter out elements from a nested collection. More generally, if c is a collection of type Collection<Collection<T>>, and e is some boolean expression, then c..?e produces a collection of type Collection<T> containing the result of first flattening c, and then filtering out those elements of the result that do not satisfy e. The following example gets the set of all employees whose salary is greater than 10000, assuming that Employees is a set-valued property of Department:

Department.Employees..?(salary>10000)

and is a shortcut for the following query:

select value e
from Departments as d, d.Employees as e
where e.salary>10000

Scoping Rules

In all the cases above, when navigating through a collection of type Collection<T>, a new scope is created, and the current collection element is bound to the variable it. For syntactic convenience, the properties (and methods) of T are also assumed to be in scope, but they are considered to be shortcuts for member-access over the it variable. For example:

Department..Name→Departments..(it.Name)

4.13 Aggregate Functions

Aggregates are expressions that reduce a series of input values (usually, but not necessarily, into a single value). They are normally used in conjunction with the select expression's group-by clause, and have constraints on where they can actually be used. Each aggregate operation is defined for one or more types. eSQL does not define a set of aggregates. It simply relies on surrounding metadata space to handle aggregate functions.

Collection-Based Aggregates

Collection based aggregates are aggregates calculated over a specific set of values. For example, given orders is a collection of all orders, one can calculate the earliest ship date with the following expression:

min(orders..ShipDate)

Expressions inside collection-based aggregates are evaluated using the current ambient name-resolution scope.

Group-Based Aggregates

Group based aggregates are calculated over a group as defined by the group-by clause. For each group in the result, a separate aggregate is calculated using the elements in each group as inputs to the aggregate calculation. When a group-by clause is used in a select expression, only grouping expression names, aggregates or constant expressions may be present in the projection or order-by clause. The following example calculates the average quantity ordered for each product:

select p, avg(ol.Quantity) from orderLines as ol
group by ol.Product as p

Group-based aggregates are simply shortcuts (to preserve compatibility with SQL) for collection-based expressions. The examples above will really translate into:

select p, avg(group..(ol.Quantity)) from orderLines as ol
group by ol.Product as p where the group expression refers to the nest aggregate implicitly produced by the group-by clause. It is possible to have a group-based aggregate without an explicit group-by clause in the select expression. All elements will be treated as a single group, equivalent to the case of specifying a grouping based on constant:

select avg(ol.Quantity) from orderLines as ol

→ select avg(group..(ol.Quantity)) from orderLines as ol
group by 1

Expressions inside the group-based aggregate are evaluated using the name-resolution scope that would be visible to the where-clause expression.

To preserve SQL look and feel, group-based aggregates may also specify an all or distinct modifier on their input. If the distinct modifier is specified, duplicates are eliminated from the aggregate input collection, before the aggregate is computed. If the all modifier is specified (or no modifier is specified), then no duplicate elimination is performed. The distinct modifier is really a syntactic abbreviation for the distinct operator:

avg(distinct ol.Quantity)

→ avg(distinct(ol.Quantity))

Distinguishing between Collection-Based and Group-Based Aggregates

Collection-based aggregates are the preferred mode of specifying aggregates in eSQL. However, group-based aggregates are also supported to ease the transition pains for SQL users. Similarly, specifying distinct (or all) as modifiers to the aggregate input is supported for SQL-like behavior, but the preferred mechanism is to use the distinct( ) operator instead. The difference in name-resolution policies between group-based and collection-based aggregates may require an implementation make evaluation attempts under both scopes. The strategy is to favor the interpretation as a collection-based aggregate first and a group-based aggregate second.

4.14 Unsupported Expressions 4.14.1 Quantified Predicates

SQL allows constructs of the form:
sal>all (select salary from employees)
sal>any (select salary from employees)

eSQL does not support such constructs. The above expressions can be expressed in eSQL as:
not exists (employees.?(sal>it.salary)
exists(employees.?(sal>it.salary))

or:
not exists(select 0 from employees as e where sal>e.salary)
exists(select 0 from employees as e where sal>e.salary)

eSQL could be extended with quantified expressions.

4.14.2*

SQL supports the use of the "*" as a syntactic shortcut in the select-clause to indicate that all columns need to be projected out.

5 Language Details—Query Expressions

The query expression is the most general purpose eSQL expression and is the most common to programmers familiar with SQL. It combines together many different query operators into a single syntax. Many of these operators can be specified individually; however none are as expressive as when combined into the query expression. Unless otherwise specified, the select expression behaves similarly to the TSQL select statement.

The query expression is composed of a series of clauses that apply successive operations to a collection of objects. They are based on the same clauses found in standard SQL select statement; select, from, where, group by, having and order by.

In its simplest form, the query expression is specified by the select keyword followed by a projection list, the from keyword, a source expression, the where keyword and finally a filtering condition:

select m from c where e

In this example, c is a collection of objects of some type T, m is a member of T with type M and e is a Boolean expression that may refer to one or more members of T. The query produces a new collection of objects with type M.

5.1 From Clause

For the most part, the from-clause has the same semantics as described for TSQL. However, it is much less restrictive in syntax, allowing any language expression that yields a collection to be a legal source. A from-clause is a comma-separated list of one or more from-clause items. The from-clause can be used to specify one or more sources for the select expression. The simplest form of a from-clause is a single expression identifying a collection and an alias:

from C as c

Generally, the select expression operates on each element of the source collection in order. This is referred to as iteration. Expressions in the select-list or where-clause may refer to properties of the current element using the alias of the collection as a variable referring to the element.

5.1.1 From Clause Item

Each from clause item refers to a source collection in the query. eSQL supports the following classes of from clause items.

5.1.1.1 Simple from Clause Item

The simplest from clause item is a single expression identifying a collection and an alias:

C as c

The alias specification is optional—an alternate specification of the above from clause item could be:

C

If no alias is specified, then eSQL attempts to generate an alias based on the collection expression. See 0 described later.

5.1.1.2 Join From Clause Item

A Join FromClauseItem represents a join between two from-clause items. eSQL supports cross joins, inner joins, left and right outer joins and full outer joins—all in similar fashion to T-SQL. As in T-SQL, the two from-clause items involved in the join must be independent—they cannot be correlated. A CrossApply/OuterApply can be used for these cases.

Cross Joins

A cross join expression produces the Cartesian product of the two collections:

C as c cross join D as d

Inner Join

An inner join produces a constrained Cartesian product of the two collections:

C as c [inner] join D as d on e

This expression processes a combination of every element of the left-hand collection paired against every element of the right-hand collection where the on condition is true. An on condition must always be specified.

Left Outer Join, Right Outer Join

An outer join expression produces a constrained Cartesian product of the two collections:

C as c left outer join D as d on e

The expression processes a combination of every element of the left-hand collection paired against every element of the right-hand collection where the on condition is true. If the on condition is false, the expression still processes a single instance of the left-hand element paired against the right-hand element with the value null. Right outer joins may be expressed in a similar fashion.

Full Outer Join

An explicit full outer join produces a constrained Cartesian product of the two collections:

C as c full outer join D as d on e

The expression processes a combination of every element of the left-hand collection paired against every element of the right-hand collection where the on condition is true. If the on condition is false, the expression still processes one instance of the left-hand element paired against the right-hand element with the value null, and one instance of the right-hand element paired against the left-hand element with the value null.

Notes:
  To preserve compatibility with Sql-92, TSql, the outer keyword is optional. So, "left join", "right join", and "full join" are synonyms for "left outer join", "right outer join" and "full outer join".
  The ON clause must be used for inner and outer joins; it is illegal for cross joins.

5.1.1.3 Apply from Clause Item eSQL supports two kinds of Apply—CrossApply and OuterApply. A cross apply produces a unique pairing of each element of the left-hand collection with an element of the collection produced by evaluating the right-hand expression. With a cross apply the right-hand expression is a function of the left-hand element:

select c, f from C as c cross apply fn(c) as f

The behavior of cross apply is similar to that described for the join-list. If the right-hand expression evaluates to an empty collection, the cross apply produces no pairings for that instance of the left-hand element.

An outer apply is similar to a cross apply, except a pairing is still produced even when the right-hand expression evaluates to an empty collection:

select c, f from C as c outer apply fn(c) as f

Note: Unlike TSql, there is no need for an explicit unnest step.

5.1.2 Multiple Collections in the from Clause

The from clause may contain more than one collection specification, separated by commas. In such cases, the collections are assumed to be joined together. Think of these as an n-way cross join.

5.1.3 Left Correlation

Items in the from-clause may refer to items specified earlier. In the example below, C and D are independent collections, while c.Names is dependent on C:

from C as c, D as d, c.Names as e this is logically equivalent to:

from (C as c join D as d) cross apply c.Names as e

5.1.4 Semantics

Logically, the collections in the from clause are assumed to be part of an n-way cross join—the degenerate case being a 1-way cross join. Aliases in the from-clause are processed left to right, and are added to the current scope for later references. The from clause is assumed to produce a multiset of rows—with one field for each item in the from clause, and representing a single element from that collection item.

In the example above, the from clause logically produces a multiset of rows of type Row(c, d, e) where fields c, d and e are assumed to be of the element type of C, D, and c.Names. eSQL introduces an alias for each simple from clause item in scope. For example, in the query below:

from (C as c join D as d) cross apply c.Names as e the names introduced into scope are c, d and e. Unlike in SQL, the from clause only introduces the aliases into scope. Any references to columns (properties) of these collections must be qualified with the alias.

5.2 Where Clause

The where-clause has the same semantics as described for TSQL. It restricts the objects produced by the query expression by limiting the elements of the source collections to those that pass the condition:

select c from cs as c where e

The expression e must have the type Boolean. The where-clause is applied directly after the from-clause, before grouping, ordering or projection. All element names defined in the from-clause are visible to the expression of the where-clause.

5.3 Group by Clause

The group-by clause has the similar semantics as described for TSQL. You may specify one or more expressions whose values are used to group source elements together for the purpose of evaluating aggregates:

select e1, count(c.d1) from c group by e1, e2, . . . , en

Each expression in the group by clause must evaluate to some type that can be compared for equality. These types are generally scalar primitives such as numbers, strings and dates. It is possible to use complex types as group-by conditions, as long as the types define a notion of equality. You may not group by a collection.

Once a group clause is specified, either explicitly or implicitly (by virtue of a having clause in the query), the current scope is hidden, and a new scope is introduced.

The select clause, the having clause and the order-by clause will no longer be able to refer to element names specified in the from-clause. You may only refer to the grouping expressions themselves. To do this, you may assign new names (aliases) to each grouping expression. If no alias is specified for a grouping expression, eSQL attempts to generate one via the alias generation rules in 0:

select g1, g2, . . . , gn from c as c1
group by as e1, as g1, e2 as g2, . . . , en as gn Expressions in the group-by clause may not refer to names defined earlier in the same group-by clause.

In addition to grouping names one may also specify aggregates in the select-clause, having-clause and the order-by clause. An aggregate contains an expression that is evaluated for each element of the group. The aggregate operator reduces the values of all these expressions (usually, but not always, into a single value). The aggregate expression may make reference to the original element names visible in the parent scope, or to any of the new names introduced by the group-by clause itself. While the aggregates appear in the select-clause, having clause and order-by clause, they are actually evaluated under the same scope as the grouping expressions:

select name, sum(o.Price * o.Quantity) as total
from orderLines as o
group by o.Product as name This query uses the group-by clause to produce a report of the cost of all products ordered, broken down by product. It gives the name 'name' to the product as part of the grouping expression, and then references that name in the select list. It also specifies the aggregate 'sum' in the select list that internally references the order line's price and quantity.

Named Groups

Groups themselves can have names. When a group is named it introduces a new name into the scope that refers to the collection of objects that form a group instance. The group itself is an aggregate—the nest aggregate—that simply aggregates all the items that match the criteria for the group into a multiset. Logically, the group by clause performs grouping based on the keys, and an implicit nest aggregate—one for each group—that contains the collection of non-key columns for that group.

Subsequent references to aggregates—group-based aggregates—are translated into collection-based aggregates, where the collection in question is the nest aggregate produced by the group by clause:

select name, sum(o.Price * o.Quantity) as total, mygroup
from orderLines o
group mygroup by o.Product as name In this example, the group mygroup is identified in the group-by clause and referenced in the select list. The name mygroup refers to a collection of OrderLine instances that form a single group. Each row of the resulting collection will have three properties; name, total and mygroup.

It is unnecessary to always define your own name for a group. Even without specifying one the group can always be accessed using the name group:

select name, sum(o.Price * o.Quantity) as total, group
from orderLines o
group by o.Product as name 5.4 Having Clause The having-clause is used to specify an additional filtering condition on the result of a grouping. If no group-by clause is specified in the query, an implicit "group by 1"—single-set group—is assumed. The having clause works just like the where clause, except that it is applied after the group-by operation. This means that the having-clause may only make reference to grouping aliases and aggregates:

select name, sum(o.Price * o.Quantity) as total
from orderLines o
group by o.Product as name
having sum(o.Quantity)>1

This example is the same as the group-by example, except the having-clause restricts the groups to only those having more than one product unit in them.

5.5 Select Clause

The list of one or more expressions following the select keyword is known as the select list or more formally as the projection. The most general form of projection is a single expression. If you select some member m from a collection c, then you will produce a new collection of all the m values for each element of c:

select c.m from c

For example, if customers is a collection of type customer that has a property Name that is of type string, then selecting Name from customers will yield a collection of strings:

select c.Name from customers as c

Row and Value Select Clauses eSQL supports two variants of the select clause. The first variant—row select—is identified by the select keyword, and can be used to specify one or more items that should be projected out. Implicitly, a row wrapper is added on around the items, with the result that the result of the query expression is always a multiset of rows—with the appropriate fields. Each expression in a row select must specify an alias. If no alias is specified, eSQL attempts to generate an alias using the aliasing rules described in 0.

The other variant of the select clause—value select—is identified by the select value keyword, and allows only one item to be specified, and does not add on a row wrapper.

A row select is always expressible in terms of an value select. For example:

select 1 as a, "abc" as b, a+34 as c
→
select value row(1 as "abc" as b, a+34 as c)

All and Distinct Modifiers

Both variants of select allow the specification of an all or distinct modifier. If the distinct modifier is specified, duplicates are eliminated from the collection produced by the query expression (upto and including the select clause). If the all modifier is specified, then no duplicate elimination is performed.

These modifiers are only preserved to be compatible with SQL. eSQL suggests the use of the distinct operator instead, but supports these variants, and transparently translates the expression:

select distinct c.a1, c.a2 from T as a
→
distinct(select c.a1, c.a2 from T as a)

Semantics

The select-clause is evaluated after the from, clause, group by and having clauses have been evaluated. The select clause may only refer to items currently in scope (via the from clause, or from outer scopes). If a group-by clause has been specified, then the select-clause is only allowed to reference the aliases for the group by keys. Referring to the from-clause items is only permitted as part of aggregate functions.

5.5.1 Deviations from SQL

No support for * eSQL does not support the use of * or the qualified * to indicate that the entire from-clause (or all columns from a table) should be projected out. Even in SQL, well-designed queries avoid these constructs, since they can have unexpected side-effects when schemas evolve. eSQL allows queries to project out entire records instead by referencing the collection aliases from the from clause. The following SQL query:

select * from T1, T2 is much better expressed in eSQL by the following construct:

select t1, t2 from T1 as t1, T2 as t2

5.6 Order by Clause

The order-by clause can specify one or more expressions that determine the ordering of the elements in the result. The order-by clause is logically applied to the result of the select-clause. It may reference items in the select-list via their aliases. In addition, it may also reference other variables that are currently in scope. However, if the select_clause has been specified with a distinct modifier, then the order-by clause may only reference aliases from the select-clause:

select c as c1 from cs as c order by c1.e1, c.e2, . . . , en

Each expression in the order-by clause must evaluate to some type that can be compared for ordered inequality, (less-than or greater-than, etc.) These types are generally scalar primitives such as numbers, strings and dates.

Each expression in the order-by clause may optionally specify sorting criteria. ASC (or DESC) may be specified to indicate that an ascending sort (or a descending sort) is needed on the specific expression. Additionally, for string-type expressions, a COLLATE clause may be specified to indicate the string collation to be used for ordering.

Positional specification, e.g., order by 3, may be used to indicate the corresponding (third) item on the select-list is not supported.

6 Language Details—Command

6.1 Command

An eSQL command is the term used for the entire query request. A command may be a query expression such as a select expression or a statement used to insert, delete or update objects. A command is logically composed of three parts.

An optional prolog
    An optional WITH clause
    A query or a DML statement.

For example, imagine there is a type called Customer and a collection of Customer instances named customers. The following are all valid commands:

customers.?(Name='Bob')
    select c.Name, c.Phone from customers c

6.1.1 Command Prologs

The (optional) command prolog may specify a set of namespaces to use. These will be described later in the section on namespaces.

6.1.2 WITH Clause eSQL supports a WITH clause as a prefix to any query (or DML statement). The syntax of the WITH clause is as follows:

withClause::=WITH<common-table-expr>[, <common-table-expr>]*
    <common-table-expr>::=<simpleIdentifier> AS <paranthesizedExpr>

Notes

<common-table-expr> definitions may refer to common-table-expressions defined earlier in the WITH clause. For example, the following definition is legal:
    WITH tab1 as ( . . . ), tab2 as (select t from tab1 as t)

6.2 Query Statement

A Query Statement is simply an expression.

6.3 DML Statement

DML Statements are described in the next section.

7 DML eSQL supports insert, update and delete DML statements.

7.1.1 Insert

The INSERT command in eSQL is very similar to the INSERT statement in standard SQL:

[WithClause] Insert [into] <container> [<with-parent>] FROM <expr>
    [WithClause] Insert [into] <container> [<with-parent>] <query_expr>
    [WithClause] Insert [into] <container> [<with-parent>] VALUES <expr>

Semantics

<container> represents any container of data. EntitySets are the most logical container.

<expr>/<query_expr> is a multiset (in the first two cases), which produces a set of values to insert into the container. In the third case (VALUES clause), <expr> is of the element type of the container.

The WithClause is defined in subsequent sections.

The With-parent clause is described in subsequent sections.

EXAMPLES

Insert into NewCustomers select o from OldCustomers as o
    Insert into NewCustomers from Multiset(Customer( . . . ), Customer( . . . ), . . . )
    -- The following statements are all equivalent
    Insert into NewCustomers from Multiset(Customer( . . . ))
    Insert into NewCustomers select c from Multiset(Customer( . . . )) as c
    Insert into NewCustomers from {Customer( . . . )}
    Insert into NewCustomers values Customer( . . . )
    Insert into NewCustomers values (Customer( . . . ))

Notes eSQL's INSERT..VALUES statement is slightly different from T-SQL. For one, the parantheses around the value are optional, and are not interpreted as a row constructor when present.

Unlike T-SQL, eSQL does not allow a column-list to be specified for an Insert statement.

7.1.2 Delete

The DELETE command in eSQL is similar to the DELETE statement in standard SQL.

[WithClause] Delete [from] <container> [as <alias>] [<with-parent-clause>] [where <expr>]

Semantics
    <container> represents any container of data. EntitySets are the most logical container.
    <expr> is a predicate (ie) of type boolean.
    <with-parent-clause> is defined later Examples:
    Delete from NewCustomers as n where n.id>10
    Delete from NewCustomers Notes
    Unlike T-SQL, the DELETE statement in eSQL does not allow multiple from clauses. Use a subquery instead.

7.1.3 Update

The update statement in eSQL is conceptually similar to the UPDATE statement in standard SQL:

```
Update_statement : := [WithClause]
                      UPDATE <container> [as <alias>]
                      [<with-parent-clause>]
                      [<set_clauses>] [<apply-clauses>]
                      [where <expr>]
<set_clauses>: := SET <set_clause> [, <set_clause>]*
<set_clause>: := <field-expr> EQUAL <expr>
<field-expr>: := <expr>
```

Semantics
    <container> represents any container of data. EntitySets are the most logical container.
    <expr> is a predicate (ie) of type boolean.
    <field-expr> is an l-value expression (i.e) it can be a column reference, a reference to a property of a column, or a TREAT expression involving such a property.
    <with-parent-clause> is defined later.

Examples:
    UPDATE NewCustomers as n
    SET n.name.firstName=UPPER(n.name.firstName),
        TREAT(n.address as
InternationalAddress).countrycode='US'
    WHERE n.name like 'ABC %'

Notes
    Unlike T-SQL, the UPDATE statement in eSQL does not allow multiple from clauses. Use a subquery instead.
    An attribute may be modified at most once in the UPDATE statement.

7.2 DML for EDM Relationships

The EDM introduces the notion of RelationshipSets as collections of relationship instances. Both Association and Composition relationships are modeled via these RelationshipSets.

7.2.1 Associations

The general usage pattern is that you first create instances of the entities, and then create relationships between the entities by inserting into the RelationshipSet. The following example demonstrates DMLs into such a relationshipset. Assume two entity types Order and Customer (with EntitySets—Orders and Customers). Further assume a relationship OrderCustomer between these two entities, and OrderCustomerSet as the relationshipset:
    -- Insert a relationship between an Order and a Customer
    Insert into OrderCustomerSet
    Select OrderCustomer (ref(o), ref(c))
    From Customers as c, Orders as o
    Where o.Id=123 and c.Name='ABC'
    -- Delete relationship between an Order and a Customer
    Delete from OrderCustomerSet as oc
    Where oc.Order.Id=123

7.2.2 Compositions

RelationshipSets corresponding to compositions are updatable as well. You must first create the parent entity instance. Unlike associations however, there is no separate step of creating the child instance. The insert into the Composition RelationshipSet automatically creates the child instance. Examples of this include:

```
-- Inserting new lines into an existing order
Insert into OrderLineSet.Line
     with parent (element (select ref (o) from Orders as o
                 where o.Id = 20))
     select Line ( . . . ) from . . .
-- modifying an existing line item
Update OrderLineSet.Line as l
     with parent (element (select ref (o) from Orders as o
                 where o. Id = 20))
Set l.description = . . .
Where . . .
-- deleting an existing line item
Delete OrderLineSet.Line as l
     with parent (element (select ref (o) from Orders as o
                 where o.Id = 20))
     where l.description = . . .
```

Note: the special "with parent as" clause for modifying the composition.

8 eSQL Misc

8.1 Recursive Queries eSQL enables support for recursive queries by allowing the table definition (paranthesizedExpr) to reference itself. For example:
    WITH tab1 as (multiset(1, 2, 3, 4, 5)),
    tab2 as (
        multiset(1)
        union all
        select t2
        from tab2 as t2, tab1 as t1
        where t2=t1
    )
    select t from tab1 as t eSQL makes no guarantees about termination of the recursion.

8.2 Support for EDM Relationships

The EDM introduces the notion of RelationshipSets—which are logical equivalents of link-tables in SQL. RelationshipSets may be queried just like other collections.

Additionally, eSQL supports navigation helpers for easier navigation over relationships. The general form of a navigation helper is the following:
    Select o.Id, o->OrderCustomer.Customer
    From Orders as o where OrderCustomer is the name of the relationship, and Customer is the name of the customer end of the relationship.

8.3 Comments eSQL supports T-SQL style comments. eSQL comments may be of the following forms:
    -- this is a comment
    /* this is also a comment */ . . .

Comments may be used at any location where a white space character is expected.

"--" (double-hyphen) style comment characters can be used on the same line as code to be executed, or on a line by themselves. Everything from the double hyphens to the end of the line is part of the comment.

/* ... */ (forward slash-asterisk character pairs). These comment characters can be used on the same line as code to be executed, on lines by themselves, or even within executable code. Everything from the open comment pair (/*) to the close comment pair (*/) is considered part of the comment. These comments can span multiple lines.

9 eSQL Name Resolution and Other Rules

9.1 Identifiers

Identifiers in eSQL are used to represent expression aliases, variable references, properties of objects, functions etc. Identifiers in eSQL may be of two kinds.

9.1.1 Simple Identifier

A simple identifier is simply a sequence of alphanumeric (and the underRank) characters The first character of the identifier must be an alphabet, a-z or A-Z.

9.1.2 Quoted Identifiers

A quoted identifier is any sequence of characters surrounded by square-brackets, or double-quotes. The default quote is a square-bracket. Double-quotes may be used as the quoting character only when the parser for eSQL allows it—the exact parser options to control this are left to the discretion of the parser. Note also that when double-quotes may be used as the quoting character, they cannot be used for string literals—string literals would then always need to use single quotes.

Quoted identifiers allow one to specify identifiers with characters that would normally not be legal in identifiers. All characters between the square-brackets (or the quotes) are considered part of the identifier, including all whitespace.

A quoted-identifier may not include the following characters:
  Newline
  Carriage returns
  Tabs
  Backspace
  ] (only in the case of [ ] style quotes)

One could invent property names with otherwise normally illegal characters:
  select c.ContactName as [Contact Name] from customers as c
  select c.ContactName as "Contact Name" from customers as c You may use a quoted-identifier to specify an identifier that would normally be considered a reserved word of the language. For example, if the type Email has a property named 'from', you could disambiguate it from the reserved word 'from' using the square-brackets:
  select e.[from] from emails as You can use a quoted identifier on the right-side of a dot-operator:
  select t from ts as where t.[a property]=2

To use the same char as the closing quote character in an identifier, you use it twice. For example:
  select t from ts as t where t.[a bc]]]=2 the identifier abc] is escaped appropriately.

9.2 Case Sensitivity

All keywords in eSQL are case insensitive (as in SQL). Identifiers may be case sensitive or case insensitive depending on the parser options specified. Keywords in eSQL are always case insensitive.

9.3 Aliasing Rules eSQL recommends that aliases be specified in queries whenever needed. Aliases are needed for the following constructs:
  Fields of a row constructor
  Items in the from clause of a query expression
  Items in the select clause of a query expression
  Items in the group by clause of a query expression
  Arguments to a join expression Valid Aliases Any simple identifier, or quoted identifier is a valid alias.

Alias Generation

If no alias is specified, eSQL attempts to generate one based on a few simple rules.
  If the expression (for which the alias is unspecified) is a simple or quoted identifier, that identifier is used as the alias. For example:
    row(a, [b])→row (a as a, [b] as [b])
  If the expression is a more complex expression, but the last component of that expression is a simple identifier, then that identifier is used as the alias. For example:
    rows(a.a1, b.[b1])→row(a.a1 as a1, b.[b1] as [b1])
  Otherwise a compile-time exception is raised.

9.4 Scoping Rules

Scoping rules define when particular variables are visible in the query language. Some expressions or statements introduce new names. The scoping rules determine where those names can be used, and when or where a new declaration with the same name as another may hide its predecessor.

When names are defined, they are said to be defined within a scope. A scope covers over a region of the query. All expressions or name references within a certain scope can see names defined within that scope. Before a scope begins and after it ends, names defined within the scope cannot be referenced.

Scopes can be nested. Parts of the language introduce new scopes that cover over regions that may contain other language expressions that also introduce scopes. When scopes are nested, references may be made to names defined within the inner-most scope that the reference is within as well as any names defined in any outer scopes. Any two scopes defined within the same scope are considered sibling scopes. References may not be made to names defined within sibling scopes.

If a name is declared within an inner scope that matches a name declared in an outer scope, references within that scope or within scopes declared within that scope refer only to the newly declared name. The name in the outer scope is hidden. Even within the same scope, names may not be referenced before they are defined.

Global names may exist as part of the execution environment. This may include names of persistent collections or environment variables. This scope that contains them is the outermost scope. Parameters are not in a scope. Since references to parameters include special syntax, names of parameters do not collide with other names in the query.

9.4.1 Query Expressions

The query expression introduces a new scope. Names defined in the from-clause are introduced into the from-scope in order of appearance, left to right. In the join-list, expressions may refer to names defined earlier in the list. Public properties (fields, etc) of elements identified in the from-clause are not added to the from-scope—they must be always referenced via the alias-qualified name. Normally, all parts of the select expression are considered within the from-scope.

The group-by clause also introduces a new sibling scope. Each group may have a group name that refers to the collection of elements in the group. Each grouping expression will also introduce a new name into the group-scope. In addition, the nest aggregate (or the named group) is also added to the scope. The grouping expressions themselves are within the from-scope. However, when a group-by clause is use, the select-list (projection), having-clause and order-by clause are considered to be within the group-scope, and not the from-scope. Aggregates get special treatment, and these are described below.

The select-list may introduce new names into the scope, in order. Projection expressions to the right may refer to names projected on the left. The orderby clause may refer to names (aliases) specified in the select list. The order of evaluation of clauses within the select expression determines the order that names are introduced into the scope. The from-clause is evaluated first, followed by the where clause, grouping-clause, having-clause, select-clause and finally the order-by-clause.

Aggregate Handling eSQL supports two forms of aggregates—collection-based aggregates and group-based aggregates. Collection-based aggregates are the preferred construct in eSQL, while group-based aggregates are simply supported for SQL compatibility.

When resolving an aggregate, eSQL first attempts to treat it as a collection-based aggregate. If that fails, then eSQL transforms the aggregate input to be a reference to the nest aggregate, and attempts to resolve this new expression. For example:

avg(t.c)→avg(group..(t.c))

9.4.2 Collection Filter/Project Operations

For the collection filter/project operators (.., ..., .? and ..?), a new scope is created for the projection/predicate, and the name it is implicitly added into scope—to represent each element of the collection. In addition, for simplicity, the public members of the collection element are also added into scope—again just for the duration of the evaluation of the projection/predicate. For example:

Departments..Name
Departments..(it.Name)

produces a multiset of department names—where each Department is assumed to have a Name property.

9.5 Namespaces eSQL introduces namespaces to address the issue of name conflicts for global identifiers such as type names, entity sets, functions etc. The namespace support in eSQL is very similar to the CLR model. eSQL provides the using clause that may be used in the Command prolog. Two forms of the using clause are provided—qualified namespaces (where a shorter alias is provided for the namespace), and unqualified namespaces:

using System.Data.TSq1,
using tsq1=System.Data.TSq1;

Name Resolution Rules

If an identifier cannot be resolved in the local scopes, eSQL then attempts to locate the name in the global scopes (ie) the namespaces. eSQL first attempts to match the identifier (prefix) with one of the qualified namespaces. If there is a match, then eSQL attempts to resolve the rest of the identifier in the specified namespace—if no match is found, an exception is raised:

using tsq1=System.Data.TSq1;
using winfs=System.Storage.WinFS;
select tsq1.substr(p.Name) from Person as p
select i.ItemId from Items as i where i is of winfs.Contact eSQL then attempts to probe all unqualified namespaces (specified in the prolog) for the identifier. If the identifier can be located in exactly one namespace, then that location is returned. If more than one namespace has a match for that identifier, an exception is raised. If no namespace can be identified for the identifier, eSQL then passes the name onto the next outward scope (the Command/Connection object):

using System.Data.TSql;
select substr(p.Name) from Person as p

Differences from the CLR Model

One difference from the CLR model is worth calling out. In the CLR, you can use partially qualified namespaces—eSQL does not allow this. For example, in C#, the following is legal, while the equivalent is not legal in eSQL:

```
using System.Data.TSql;
void main( ) {
    int x = Y.Z.Foo( ); -- reference to method Foo of
class Z in
            -- namespace System.Data.TSql.Y
}
```

ADO .NET Usage

Queries/DML statements are expressed via ADO .NET Commands. Commands may be built over Connection objects. Namespaces may be specified as part of the Command and Connection objects as well. If eSQL cannot resolve an identifier within the query itself, then the external namespaces are probed (via similar rules). The query, Command and Connection objects form rings of namespaces—where each ring is probed first.

9.6 Null Literals and Type Inferencing

As described earlier, null literals are compatible with any type in the eSQL type system. However, for the type of a null literal to be inferenced correctly, eSQL imposes certain constraints on where a null literal may be used. The following rules apply Typed Nulls Typed nulls (i.e.) "cast(null as Int16)" may be used anywhere; there is no further need for type inferencing, since the type is known at this time.

Free Floating Null Literals

Free-floating null literals may be used in the following contexts:

As an argument to a cast/treat expression—this is the recommended mechanism to produced a typed null expression.

An argument to a method or a function. (Standard overload rules apply, and if one overload cannot be picked, then a compilation error is raised)

As one of the arguments to an arithmetic expression such as +, −, , /. The other argument(s) cannot be null literals; otherwise type inferencing is not possible.

As one of the arguments to a logical expression (and/or/not)—all the arguments are known to be of type boolean.

As the argument to an "is null" or "is not null" expression—the expressions "null is null" and "null is not null" are legal (but silly)

As one or more of the arguments to a like expression—all the arguments are expected to be strings.

As one or more of the arguments to a named-type constructor.

As one or more of the arguments to a multiset constructor. However, at least one argument to the multiset constructor must be an expression other than a null literal.

As one or more of the then/else expressions in a case expression. At least one of the then/else expressions in the case expression must be an expression other than a null literal.

Free floating null literals may not be used in other scenarios. Some of these scenarios (not exhaustive; included only for illustration) include Arguments to a row constructor.

Notes

The is null and is not null expressions are considered to be special.

10 eSQL Type System eSQL operates on, and produces instances of the Entity Data Model (EDM). This document will not go into the details of the EDM; instead, a couple of special interest items are called out.

10.1 Row Types

Rows (a.k.a. tuples) are structural by membership. A row's structure depends on the sequence of typed and named members that it is comprised of A row is a EDM InlineType—it has no identity and cannot be inherited from.

Instances of the same row type are equivalent if the members are respectively equivalent. Rows have no behavior beyond their structural equivalence.

Rows have no equivalent in the common language runtime. Queries may result in structures containing rows or collections of rows.

The API binding between the eSQL queries and the host language will define how rows are realized in the result of the query. In ADO .NET, rows will be surfaced as DataRecords.

10.2 Collections

Collection types represent zero or more instances of other objects. The EDM supports several kinds of collections—including multisets, lists etc. This document only deals with Multisets.

10.3 Nullability

In the EDM, nullability is a constraint on a property, and not a facet of a Type itself. Every type in the EDM is nullable. Null literals in eSQL are considered to be compatible with every other type in the EDM.

10.3.1 Null Semantics

Nulls in eSQL behave very similarly to Nulls in TSq1. Specifically, most expressions that operate on a null return nulls. This includes:

Arithmetic expressions

Logical Expressions

Type Expressions

The following expressions may not return nulls when one or more of their arguments are null:

Constructors (type, row, multiset)

Functions/Methods

Is null and is not null operators others

10.4 Implicit Type Promotion eSQL defines a variety of common binary and unary operators, such as addition, multiplication and negation over primitive data types such as integer, float and string. Normally, binary operators such as addition operate over two instances of the same data type. However, it is sometimes legal to request an operator work over two instances of differing type; for example, adding and integer and a float.

For this to work, one of the two operands must be promoted to the type of the other. In general, this is the type with the most precision, so there is no data loss during the conversion. In some circumstances, both operands are promoted to a third type to insure there is no data loss.

The following table lists the implicit type promotions built into the language. The first column lists the base type and the second column lists the most immediate promotions that can be made to the type. For example, an Int16 can promote to an Int32. Yet, it may also promote to an Int64, since and Int32 can promote to and Int64.

| Type | Promotions |
| --- | --- |
| Boolean | none |
| SByte | Int16, Single, Decimal |
| Int16 | Int32, Single, Decimal |
| Int32 | Int64, Double, Decimal |
| Int64 | Decimal |
| Byte | Int16, UInt16, Single, Decimal |
| UInt16 | Int32, UInt32, Single, Decimal |
| UInt32 | Int64, UInt64, Double, Decimal |
| UInt64 | Decimal |
| Single | Double, Decimal |
| Double | Decimal |
| Decimal | none |
| Char | String |
| String | none |
| DateTime | none |
| Guid | none |

Types that are not listed or are listed as having a promotion of 'none' cannot be implicitly promoted.

If one wanted to know the correct type promotion when attempting to add an Int16 to a float, one could look to the table to see that an Int16 will indeed promote to a float, yet a float will not promote to an Int16. Therefore, the Int16 will be promoted to a float, so that two floats may be added together.

A slightly more complicated example would have and Int32 being added to a float. Notice that and Int32 will not promote to a float and a float will not promote to an Int32. However, both Int32 and float will promote to a double. Therefore, both operands are promoted to double, and two doubles are added together.

10.5 Legal Type Conversions

Following is a table of legal conversions between primitive data types.

| | Boolean | SByte | Int16 | Int32 | Int64 | Byte | UInt16 | UInt32 | Unit64 | Single | Double | Decimal | DateTim | Guid | Char | String |
|---|---|---|---|---|---|---|---|---|---|---|---|---|---|---|---|---|
| Boolean | • | | | | | | | | | | | | | | | • |
| SByte | | • | • | • | • | • | • | • | • | • | • | • | | | | • |
| Int16 | | • | • | • | • | • | • | • | • | • | • | • | | | | • |
| Int32 | | • | • | • | • | • | • | • | • | • | • | • | | | | • |
| Int64 | | • | • | • | • | • | • | • | • | • | • | • | | | | • |
| Byte | | • | • | • | • | • | • | • | • | • | • | • | | | | • |
| UInt16 | | • | • | • | • | • | • | • | • | • | • | • | | | | • |
| UInt32 | | • | • | • | • | • | • | • | • | • | • | • | | | | • |
| UInt64 | | • | • | • | • | • | • | • | • | • | • | • | | | | • |
| Single | | • | • | • | • | • | • | • | • | • | • | • | | | | • |
| Double | | • | • | • | • | • | • | • | • | • | • | • | | | | • |
| Decimal | | • | • | • | • | • | • | • | • | • | • | • | | | | • |
| DateTime | | | | | | | | | | | | | • | | | • |
| Char | | | | | | | | | | | | | | | • | • |
| String | • | • | • | • | • | • | • | • | • | • | • | • | • | • | • | • |
| Guid | | | | | | | | | | | | | | • | | • |

11 Host Language Bindings

The host language binding is the API by which you interact with eSQL. eSQL has been designed as a query language that is accessed via an API from a host programming language in much the same way that current TSQL is accessed by programmers using Microsoft's data access API's. Conceptually, the data that is being queried resides somewhere outside the domain of the host language, in a database or other persistent store, or a data structure that is opaque to normal language operators.

The preferred data access mechanism for eSQL is ADO .NET. The Command object in ADO .NET has a CommandText property (which can be set to a eSQL query string). The Execute method on the Command object returns a DataReader (which supports an IEnumerator interface). The DataReader is logically a collection of DataRecords, where a DataRecord represents a single element of the result.

12 Grammar

12.1 Command

| | |
|---|---|
| command | ::= [ prolog ] [withClause] ( query \| dml ) |
| prolog | ::= { NamespaceDecl ; }* |
| NamespaceDecl | ::= using (AliasedNamespaceDecl \| UnaliasedNamespaceDecl) |
| AliasedNamespaceDecl | ::= simpleIdentfier = identifier |
| UnaliasedNamespaceDecl | ::= identifier |
| with Clause | ::= with withClauseItemList |
| with ClauseItemList | ::= with ClauseItem \| with ClauseItemList, with ClauseItem |
| withClauseItem | ::= simpleIdentfier as paranthesizedExpr |

12.2 DML

| | |
|---|---|
| dml | ::= insert \| update \| delete |
| insert | ::= insert [ into ] expr [ with-parent-clause ] from expr<br>\| insert [ into ] expr [ with-parent-clause ] queryExpr |

-continued

| | |
|---|---|
| | \| insert [ into ] expr [ with-parent-clause ] values expr |
| delete | ::= delete [ from ] aliasedExpr [ with-parent-clause ] [ where expr ] |
| update | ::= update aliasedExpr [ with-parent-clause ] set-clause [ where expr ] |
| with-parent-clause | ::= with parent parenthesizedExpr |
| set-clause | ::= set set-clause-item-list |
| set-clause-item-list | ::= set-clause__item \| set-clause-item-list , set-clause-item |
| set-clause-item | ::= simple-set-clause-item |
| simple-set-clause-item | ::= expr = expr |

12.3 Query Expressions

| | |
|---|---|
| query | ::= generalExpr |
| generalExpr | ::= expr<br>\| queryExpr |
| expr | ::= literalExpr<br>\| parameterExpr<br>\| variableRefExpr<br>\| \| builtinExpr<br>\| dotExpr<br>\| constructorExpr<br>\| methodExpr<br>\| aggregateExpr<br>\| collectionNavigationExpr<br>\| relationshipNavigationExpr<br>\| setOpExpr<br>\| paranthesizedExpr |
| exprList | ::= expr [, expr]* |
| aliasedExpr | ::= expr as identfier \| expr |
| paranthesizedExpr | ::= ( generalExpr ) |
| literalExpr | ::= numericLiteral<br>\| stringLiteral<br>\| booleanLiteral<br>\| nullLiteral |
| parameterExpr | ::= @ simpleIdentifier |
| variableRefExpr | ::= identifier |
| dotExpr | ::= expr . identifier |
| methodExpr | ::= [ expr . ] identifier ( [ all \| distinct ] [ exprList ] ) |

-continued

```
constructorExpr            ::= rowConstructorExpr
                             | objectConstructorExpr
                             | multisetConstructorExpr
rowConstructorExpr         ::= row ( aliasedExpr [, aliasedExpr ] * )
multisetConstructorExpr    ::= multiset ( [ exprList ] )
                             | { [exprList ] }
objectConstructorExpr      ::= [ identifier . ]* identifier ( [ exprList ] )
aggregateExpr              ::= [identifier.]* identifier ( [ all | distinct ] exprList )
builtinExpr                ::= arithmeticExpr
                             | comparisonExpr
                             | logicalExpr
                             | likeExpr
                             | isNullExpr
                             | betweenExpr
                             | caseExpr
                             | typeOpExpr
                             | refExpr
                             | derefExpr
                             | keyExpr
                             | createRefExpr
arithmeticExpr             ::= expr + expr
                             | expr − expr
                             | expr * expr
                             | expr / expr
                             | expr % expr
                             | + expr
                             | − expr
comparisonExpr             ::= expr < expr
                             | expr > expr
                             | expr = expr
                             | expr <= expr
                             | expr >= expr
                             | <> expr
logicalExpr                ::= expr and expr
                             | expr && expr
                             | expr or expr
                             | expr || expr
                             | not expr
                             | ! expr
isNullExpr                 ::= expr is [ not ] null
likeExpr                   ::= expr [ not ] like expr escape expr
betweenExpr                ::= expr [ not ] between expr and expr
derefExpr                  ::= deref ( expr )
refExpr                    ::= ref ( identifier )
createRefExpr              ::= createref ( identifier, expr )
keyExpr                    ::  key( expr )
caseExpr                   ::= case whenList [ elseExpr ] end
whenList                   ::= whenExpr { whenExpr }
whenExpr                   ::= when expr then expr
elseExpr                   ::= else expr
typeOpExpr                 ::= treat ( expr as expr )
                             | cast ( expr as expr )
                             | expr is [ not ] of ( [ only ] expr )
                             | oftype ( expr , expr )
relationshipNavigationExpr ::= expr -> identifier . identifier
collectionNavigationExpr   ::= expr .. expr
                             | expr .? expr
                             | expr ... expr
                             | expr ..? expr
setOpExpr                  ::= expr union expr
                             | expr union all expr
                             | expr intersect expr
                             | expr except expr
                             | expr overlaps expr
                             | expr in expr
                             | exists ( generalExpr )
                             | element ( general Expr )
                             | flatten ( generalExpr )
queryExpr                  ::= selectClause
                               fromClause
                               [ whereClause ]
                               [ groupByClause ]
                               [ havingClause ]
                               [ orderByClause ]
selectClause               ::= rowSelectClause
                             | valueSelectClause
rowSelectClause            ::= select [ all | distinct ] aliasedExpr
                               { , aliasedExpr }
valueSelectClause          ::= select value [ all | distinct ] expr
fromClause                 ::  from fromClauseItem { ,
                               fromClauseItem }
from ClauseItem            ::= simpleFromClauseItem
                             | joinFromClauseItem
                             | ( joinFromClauseItem )
                             | applyFromClauseItem
                             | ( applyFromClauseItem )
simpleFromClauseItem       ::= expr
                             | expr as simpleIdentifier
joinType                   ::= left [ outer ] join
                             | right [ outer ] join
                             | [ inner ] join
                             | full [ outer ] join
joinFromClauseItem         ::= fromClauseItem cross join
                               fromClauseItem
                             | fromClauseItem joinType
                               fromClauseItem
applyType                  ::= cross apply
                             | outer apply
applyFromClauseItem        ::= fromClauseItem
                               applyTypefromClauseItem
whereClause                ::= where expr
groupByClause              ::= group [ identifier ] by aliasedExpr
                               { ,aliasedExpr }
havingClause               ::= having expr
orderByClause              ::= order by orderByClauseItem
                               { , orderByClauseItem }
orderByClauseItem          ::= expr [ collate collation ] [ asc ] | desc ]
collation                  ::= simpleIdentifier
identifier                 ::= quotedIdentifier | simpleIdentifier
quotedIdentifier           ::= [ unicodeCharacters ]
                             | " unicodeCharacters "
unicodeCharacters          ::= unicodeCharacter { unicodeCharacter }
simpleIdentifier           ::= letter { letter | digit | _ }
numericLiteral             ::= int32Literal
                             | int64Literal
                             | doubleLiteral
                             | floatLiteral
                             | decimalLiteral
nullLiteral                ::= null
booleanLiteral             ::= true | false
int32Literal               ::= digit { digit }
int64Literal               ::= integerLiteral L
doubleLiteral              ::= digit { digit } . digit { digit }
                               [ ( E | e ) [+ | −] digit { digit } ]
floatLiteral               ::= doubleLiteral f
decimalLiteral             ::= digit { digit } . digit { digit } M
stringLiteral              ::= ' { unicodeCharacter } '
                             | " { unicodeCharacter } "
```

APPENDIX B

Detailed Specification for Extensions to the Exemplary Query Language

1 Overview

1.1 Purpose

This document details the extensions (functions) to the eSQL query language for WinFS/CDP.

eSQL provides support for invoking functions, but does not provide any builtin functions on its own. (Operators like +, −, etc. are handled differently, and are assumed to be baked into the language itself). Users of languages like T-SQL and other dialects of SQL are accustomed to a rich set of builtin functions. The purpose of this document is to describe how eSQL can be extended to address these requirements.

Fundamentally, all functions in eSQL are treated the same: as user-defined functions. eSQL uses namespaces to define different containers of functions in a similar fashion to the use of namespaces for containing types. Providers may define such namespaces with the associated set of functions, and make them available via the metadata services to users of eSQL. This document focuses on the specific set of built in functions available from SQL Server and WinFS and the namespaces that they are made available through.

This document does not address the question of how providers supply this list of functions, and how these are loaded by the rest of the system.

These extensions are grouped by the storage providers that support them. The list of providers is as follows:
1. SQL Server 2000.
2. SQL Server 2005. This provider supports all the SQL 2000 functions
3. WinFS. This provider supports all the SQL 2005 and SQL 2000 functions The following table summarizes the functionality:

Namespaces may be imported into a query using eSQL's using clause. Alternately, one or more namespaces may be specified outside the bounds of the query, for example, as part of the Command/Connection objects.

1.3 Extension Execution

Query execution (including extension functions) always happens at the store. Additionally, unless noted otherwise, the semantics of the extension functions are expected to be the same as the server. The eSQL parsers validate the signature of

| Area | Namespace | Description | SQL 2000 | SQL 2005 | WinFS |
|---|---|---|---|---|---|
| Aggregates | System.Data.TSql.Aggregates | Functions like min( ), max( ), sum( ) etc. | ✓ | ✓ | ✓ |
| String Functions | System.Data.TSql.String | Concat( ), Substring( ), Len( ) etc. | ✓ | ✓ | ✓ |
| Math Functions | System.Data.TSql.Math | Abs( ), Sqrt( ), Sign( ) etc. | ✓ | ✓ | ✓ |
| DateTime Functions | System.Data.TSql.Date | GetDate( ), GetUTCDate( ) etc. | ✓ | ✓ | ✓ |
| System Functions | System.Data.TSql.System | Current_Timestamp, NewID( ) etc | ? (Partial support) | ✓ | ✓ |
| XML Functions | System.Data.TSql.XML | XML Queries | | ✓ | ✓ |
| WinFS Functions | System.Data.TSql.WinFS | WinFS full-text search SumString | | | ✓ |

Please see later sections of the document for cases listed as partial support in the table above.

1.2 Extension Mechanism

Details on the eSQL extension mechanism that enable the extension functionality can be found in section 9.4 (Namespaces) of the eSQL Language specification. Note that partial namespaces are not supported; see the eSQL language spec for more details.

function invocations; however, any semantic validation is performed at the underlying store.

2. Detailed Design

2.1 Aggregates

Aggregate functions perform a calculation on a multi-set of values and return a single value. With the exception of COUNT, aggregate functions ignore null values. The following available SQL functions are supported:

| Function | Data Types | Description |
|---|---|---|
| avg(x) | Supports int and float. Return type int or float respectively. | Returns the average of the values in a collection. Null values are ignored. |
| count(x) | Supports all CDM data types. Return type int. | Returns the number of items in a collection. |
| max(x) | Supports numeric types, string and datetime types. Return type is same as the expression x. | Returns the maximum value in the collection. |
| min(x) | Supports numeric types, string and datetime types. Return type is same as the expression x. | Returns the minimum value in the collection. |
| sum(x) | Supports int and float. Return type int or float respectively. | Returns the sum of all the values in a collection. Null values are ignored. |

Aggregate functions ignore null values when computing the value (except for count). Also note that count(*) is not supported. Aggregate functions can be used in a predicate and in a projection definition. Additionally, the aggregates support a "distinct" mode (similar to SQL support) on datatypes that support equality. The return type of these functions is based on the type of the property the function is executed against. So, for example, avg(int) will return an int. This may not be expected as the average of 2.3 will return 2 rather than 2.5. To workaround this the user needs to explicitly cast the property to a type that has the right precision, e.g., avg(cast (intProperty as double)).

2.1.1 Namespace

These functions are in the System.Data.Tsql.Aggregates namespace.

2.1.2 Examples using System.Data.TSql.Aggregates;
select count(i.Children) as Count
from Items as i;
select max(i.DisplayName)
from Items as i
group by i.Gender;

2.1.3 Supported Platforms

Supported on: SQL 2000, SQL 2005 and WinFS.

2.2 String Functions

These scalar functions perform an operation on a string input value and return a string or numeric value.

| Function | Description |
| --- | --- |
| ascii(x) | Returns the ASCII code value of the leftmost character of a character expression. |
| char(x) | A string function that converts an int ASCII code to a character. |
| replicate(x, y) | Repeats a character expression x for a specified number of times y. |
| patindex (x, y) | Returns the starting position of the first occurrence of a pattern x in a specified expression y, or zeros if the pattern is not found, on all valid text and character data types. |
| stuff (x, y, z, a) | Deletes a specified length of characters z and inserts another set of characters a at a specified starting point y in a string expression x. |
| space(x) | Returns a string of repeated spaces, where x is an integer expression. |
| len(x) | Returns the number of characters, rather than the number of bytes, of the given string expression, excluding trailing blanks. |
| substring(x, y [, z]) | Returns a part of the string, starting at index (one based) y and for an optional number of characters z. |
| lower(x) | Returns a copy of this String converted to lower-case, using the casing rules of the current culture. |
| upper(x) | Returns a copy of this String converted to upper-case, using the casing rules of the current culture. |
| charindex(x, y [, z]) | Reports the index of the first occurrence of the specified string y in x. The search can optional start at a specified character position z. |
| ltrim(x) | Returns a character expression after removing leading blanks. |
| rtrim(x) | Returns a character string after truncating all trailing blanks. |
| replace(x, y, z) | Replaces all occurrences of the second given string expression y in the first string expression x with a third expression z. |
| reverse(x) | Returns the reverse of a string expression. |

Please note that all string functions have one based indexes.

2.2.1 Namespace

These functions are in the System.Data.Tsql.String namespace.

2.2.2 Examples using System.Data.String;
select substring(reverse(i.DisplayName), 1, 5)
from Items as i 2.2.3 Supported Platforms Supported on: SQL 2000, SQL 2005 and WinFS.

2.3 Math Functions

These scalar functions perform a common set of mathematical operations.

| Function | Description |
| --- | --- |
| Abs(x) | Returns the absolute, positive value of the given numeric expression. |
| Acos(x) | Returns the angle, in radians, whose cosine is the given float expression; also called arccosine. |
| Asin(x) | Returns the angle, in radians, whose sine is the given float expression (also called arcsine). |
| Atan(x) | Returns the angle in radians whose tangent is the given float expression (also called arctangent). |
| Atn2(x, y) | Returns the angle, in radians, whose tangent is between the two given float expressions (also called arctangent). |
| Ceiling(x) | Returns the smallest integer greater than, or equal to, the given numeric expression. |
| Cos(x) | A mathematic function that returns the trigonometric cosine of the given angle (in radians) in the given expression. |
| Exp(x) | Returns the exponential value of the given float expression. |
| Floor(x) | Returns the largest integer less than or equal to the given numeric expression. |
| Log(x [, y]) | Returns the natural logarithm of the given float expression. |
| Log10(x) | Returns the base-10 logarithm of the given float expression. |
| Pow(x,y) | Returns the value of the given expression (x) to the specified power (y). |
| Round(x[, y]) | Returns a numeric expression, rounded to the specified length or precision. |
| Sign(x) | Returns the positive (+1), zero (0), or negative (−1) sign of the given expression. |
| Sqrt(x) | Returns the square root of the given expression. |
| Tan(x) | Returns the tangent of the input expression. |
| Degrees(x) | Given an angle in radians, returns the corresponding angle in degrees. |
| Radians(x) | Returns radians when a numeric expression, in degrees, is entered. |
| Rand([x]) | Returns a random float value from 0 through 1. |
| Sin(x) | Returns the trigonometric sine of the given angle (in radians) in an approximate numeric (float) expression. |
| Square(x) | Returns the square of the given expression. |
| PI( ) | Returns the constant value of PI as a float. |

2.3.1 Namespace

These functions are in the System.Data.TSql.Math namespace.

2.3.2 Examples using System.Data.TSql.Math;
select PI( )
from Items as i 2.3.3 Supported Platforms Supported on: SQL 2000, SQL 2005 and WinFS.

2.4 Date Functions

These scalar functions perform an operation on a date and time input value and return a string, numeric, or date and time value:

| Function | Description |
|---|---|
| DateAdd(x, y, z) | Returns a new datetime value based on adding an interval to the specified date. Where x is a datepart (e.g. Year, Month, Day) and y is a number and z is a date. |
| DateDiff(x, y, z) | Returns the number of date and time boundaries crossed between two specified dates. Where x is a datepart (e.g. Year, Month, Day) and y is the start date and z is the end date. |
| DateName(x, y) | Returns a character string representing the specified datepart of the specified date. Where x is a datepart (e.g. Year, Month, Day) and y is the date. |
| DatePart(x, y) | Returns an integer representing the specified datepart of the specified date. Where x is a datepart (e.g. Year, Month, Day) and y is the date. |
| Day(x) | Returns an integer representing the Day datepart of the specified date. Where x is the date. |
| GetDate( ) | Returns the current date and time (on the server) as a DateTime. Datetime.Kind will be set to Local time. |
| GetUtcDate( ) | Returns the datetime value in UTC format. DateTime.Kind will be set to UTC. Note that there may be a loss in precision. |
| Month(x) | Returns an integer representing the Month datepart of the specified date. Where x is the date. |
| Year(x) | Returns an integer representing the Year datepart of the specified date. Where x is the date. |

2.4.1 Namespace

These functions are in the System.Data.TSql.Date namespace.

2.4.2 Examples

The datepart needs to be specified as a string literal:
using System.Data.TSql.Date;
select i
from Items as i
where i.ModifiedTime>dateadd('day', −10, i.ModifiedTime)

2.4.3 Supported Platforms

Supported on: SQL 2000, SQL 2005 and WinFS.

2.5 System Functions

There are a set of System functions that vary by platform that live in the System.Data.TSql.System namespace. The following table summarizes them:

| Function | Description | SQL 2000 | SQL 2005 | WinFS |
|---|---|---|---|---|
| Soundex(x) | Where x is a string expression. | ✓ | ✓ | ✓ |
| Difference(x,y) | x and y are string expressions | ✓ | ✓ | ✓ |
| DataLength(x) | Where x is a property. | ✓ | ✓ | ✓ |
| Current_Timestamp | Returns the current date and time. This function is equivalent to GETDATE( ). | ✓ | ✓ | ✓ |
| Newid( ) | Creates a unique value of type Guid. | ✓ | ✓ | ✓ |

The following sections provide more details for specific functions.

2.5.1 Soundex & Difference

The Soundex function maps to the T-SQL Soundex function and is used to convert an alpha string to a four-character code to find similar-sounding words or names. The first character of the code is the first character of character_expression and the second through fourth characters of the code are numbers. Vowels in character_expression are ignored unless they are the first letter of the string. String functions can be nested. The syntax for this is as follows:
string soundex(string character_expression)

The Difference returns the difference between the SOUNDEX values of two character expressions as an integer. This function can be useful in sorting names by pronunciation for example. The syntax for this is as follows:
int difference (string character_expression,
string character_expression)

The following are examples of using soundex and difference in a query:
using System.Data.TSql.System,
// get the data length of DisplayName for all items
select p.DisplayName, p.FullName.GivenName, p.FullName.Surname
from OfType(Items, Person) as p
order by soundex(p.FullName.Surname) desc

2.5.1.1 Supported Platforms

Supported on: SQL 2000, SQL 2005 and WinFS.

2.5.2 Datalength

The Datalength function is used to return the size of properties (as an int). It maps to the SQL datalength function. The syntax for this is as follows:
int datalength(property)

In case where the property has no value (i.e. null) the return value is zero *not*null. This is contrast to the way the SQL datalength function works. The following are examples of using datalength in a query:
using System.Data.TSql.System;
// get the data length of DisplayName for all items
select WinFS.Datalength(i.DisplayName)
from Items as i
// get the data length of the Message Body
select sum(datalength(m.Body..Content)),
m.Subject
from OfType(Items, Message) as m

2.5.2.1 Supported Platforms

Supported on: SQL 2005 and WinFS.

2.6 XML Functions

Support for XML queries is enabled via extension functions. The following extension functions are provided:

| Function | Description | Comments |
|---|---|---|
| query | query( ) method of XML datatype | xml instance is first arg |

-continued

| Function | Description | Comments |
|---|---|---|
| value | value( ) method of XML datatype. | xml instance is first arg; (Second arg is always assumed to be SqlType string) |
| exist | exist( ) method of XML datatype | xml instance is first arg |

XML query(XML xmldoc, string query);
boolean exist(XML xmldoc, string query);
string value(XML xmldoc, string query);

2.6.1 Namespace

These functions are in the System.Data.TSql.XML namespace.

2.6.2 Examples
using System.Data.TSql.XML;
select i
from Items as i
where Exist(i.XMLProperty, '//text( )')

2.6.3 Supported Platforms
Supported on: SQL 2005 and WinFS.

2.7 WinFS Functions 2.7.1 Full-Text Queries (WinFS only)

WinFS shall support two TVFs—Contains and FreeText (two overloads for each)—for full-text searching. These functions are mapped to functionality in MSSearch:

type FTFElementType as row(ItemID, Guid, Rank Int);
type FTFType as Multiset<FTFElementType>;
FTFType Contains(string containsQuery);
FTFTypeContains(string propName, string containsQuery);
FTFType FreeText(string freeTextQuery);
FTFType FreeText(string propName, string freeTextQuery);

All of these functions return a multiset of rows—each with two fields. The ItemId field is a Guid and is the id of an Item that matched the full text predicate. The Rank field is the Rank for that item. The result is not sorted by the Rank—an explicit order by must be used in the query to achieve this.

Contains

Contains models MSSearch's Contains predicate. The contains Query argument must conform to the syntax specified by MSSearch's Contains predicate. The propName argument must conform to the syntax used to specify a search property during WinFS schema installation.

FreeText

FreeText models MSSearch's FreeText predicate. The freeTextQuery argument must conform to the syntax specified by MSSearch's FreeText predicate. The propName argument must conform to the syntax used to specify a search property during WinFS schema installation.

Notes eSQL does not interpret any of the arguments. It only cares that they must be strings.

2.7.1.1 Mechanics

Schema Installation

When a WinFS schema is installed, any search properties are identified and stored in the client assembly. The syntax for property specification is as follows:

| Description | Spec | Example |
|---|---|---|
| Top-level property of Item or one of its subtypes | <typename>.<propertyname> | Contact.DisplayName |
| Nested property of Item or one of its subtypes | <typename>.<propertyname>.<propertyname> | Contact.FullName.FirstName |
| Property of a subtype of a nested inline type | treat(<typename>.<propertyname> as type).<propertyname> | treat(Contact.Address as UsAddress).Zip |
| Property of a collection | <typename>.<propertyname>..<propertyname> | Contact.Phones..AreaCode |
| All properties | | |

Query Processing

As mentioned earlier, eSQL does not interpret the arguments to these functions. More specifically, the WinFS runtime—which parses the query—does not perform any checks other than to ensure that the parameters are strings.

The WinFS Provider is responsible for interpreting the propertyName argument—possibly as part of SqlGen, looking up the appropriate property id in the client assembly, and then translating it into an equivalent TVF call in the store. The store TVFs will have signatures that look like:

create function FullTextSearch(@sqlStr nvarchar(max))

returns @rTable table (ItemId

[System.Storage.Store,0.1,*,f45b95b0f79f4fbe].ItemId, Rank int)

create function FullTextSearch(@propId uniqueidentifier, @sqlStr nvarchar(max))

returns @rTable table (ItemId

[System.Storage.Store,0.1,*,f45b95b0f79f4fbe].ItemId, Rank int)

2.7.1.2 Namespace 2.7.1.3 Examples

These functions are in the System.Data.TSql.WinFS namespace.

The following examples illustrate the usage of these functions:

```
using System.Data.TSql.WinFS;
select i.DisplayName, c.Rank
from Items as i,
Contains('foo and bar') as c
where i.ItemId=c.ItemId;
select i.DisplayName, c.Rank
from Items as i,
Contains('Contact.DisplayName', 'foo and bar') as c
where i.ItemId=c.ItemId;
select i.DisplayName, c.Rank
from Items as i,
FreeText('Treat(Contact.EAddress as UsAddress).Zip',
'12345') as c
where i.ItemId=c.ItemId
order by c.Rank desc;
```

2.7.1.4 Supported Platforms
Supported on: WinFS.

2.7.2 SumString (WinFS Only)

The SumString aggregate (which maps to a store UDF called SumString) provides the ability to concatenate the contents of a collection of strings into a single string with a delimiter. This is useful for a number of App scenarios including displaying the 'To' list of Message participants in a single text field.

This eSQL extension is an aggregate function similar to count, sum, max etc, and can be applied to string properties on InlineObjectCollections, ItemFragmentCollections, ExtensionCollections and any string property as a result of a Group operation. The syntax for this aggregate is as follows:

string SumString(Multiset<string> coll)

where collection has to be a collection of strings.

2.7.2.1 Namespace

These functions are in the System.Data.TSql.WinFS namespace.

2.7.2.2 Examples

The following is an example of using SumString in a query:

```
using System.Data.TSql.WinFS:
// concatenate the list of ParticipantEAddress together
select                SumString(m.Participants.?
(ParticipantType=Sender)
..ParticipantEAddress.Address),
m.Subject
from OfType(Items, Message) as m
```

2.7.2.5 Supported Platforms
Supported on: WinFS.

2.7.3 NormalizeDigits (WinFS Only)

The NormalizeDigits aggregate (which maps to a store UDF called normalizedigits) provides the ability to sort strings in a format similar to the windows shell sorting. The syntax for this function is as follows:

string NormalizeDigits(string property, int maxLength)

2.7.3.1 Namespace

These functions are in the System.Data.TSql.WinFS namespace.

2.7.3.2 Examples

The following is an example of using SumString in a query:

```
using System.Data.TSql.WinFS;
// order items using the function
select i.ItemId, i.NamespaceName
from Items as i
order by NormalizDigits(i.NamespaceName, 4000)
```

2.7.3.3 Supported Platforms
Supported on: WinFS.

3 Namespace Loading

All of the namespaces described in this document should be automatically loaded when connecting to a SqlClient provider. There should be no need to use an explicit "using" clause.

4 Calculated Methods and Properties

The eSQL query language supports an extension mechanism by which properties that are added to the O-Space partial class (i.e. non-mapped properties) can be referenced in queries. These properties require an eSQL expression to be associated with them through an attribute. This is expression is then replaced wherever the property is referenced in a query.

The eSQL expression that is supplied can reference other calculated properties and methods, other mapped properties and other functions that are specified in the Provider manifest.

4.1 Calculated Properties

The System.Data.Objects.CalculatedAttribute can be added to a Property that is only defined in a client class (no mapped property) to enable reference of the property in queries.

The type of the CLR Property must match the type returned by the eSQL expression. If the return type of the expression is a nullable type then the property must be declared as a nullable type. This constraint is enforced by the infrastructure, and an exception will be thrown. If the return type of the expression is a collection then the Property must be of type Query<T>.

The ItemSize property on Item is an actual example of a calculated property that exists in the Schema today. The following is an example of using this property:

```
// The following retrieves all documents that are greater than
10 k (~10000 bytes) in a particular folder Query<Item>   searcher=wd.Items.Source.Where("it.Item-
Size>100000");
```

This property will be marked with the following attribute:

```
[Calculated
(Expression="System.Storage.Item.GetItemSize(ItemId)")]
public int ItemSize {get;}
```

The expression above refers to a function in the provider manifest which maps to a store side function.

PrimaryEmailAddress is an example of a property that could be calculated from schema and now through this functionality can be predicated and projected through eSQL. This property could return the Email address of a Person marked with the Primary Keyword. The following code illustrates how to define this PrimaryEmailAddress property to enable querying it through eSQL:

```
public partial class PersonItem : . . .
{
. . .
// Attribute the PrimaryEmailAddress property
// the @keyword refers to the calculated parameter
[Calculated (Express ion= @
    "using System.Storage.Contacts;
    element (select value e
        from this.EAddresses as e
        where e is of SmtpEmailAddress
        and exists (select 1
            from e.Keywords
            where Value="keyword") ) ) ") ]
```

-continued

```
[CalculatedParameter (Name="keyword", Value="System.Storage.Con-
tacts.Primary")]
public SmtpEmailAddress PrimaryEmailAddress
{
  get
  {
    foreach ( SmtpEmailAddress smtpEA in
    EAddresses.OfType<SmtpEmailAddress>( )
)
    {
      foreach (Keyword k in smtpEA.Keywords)
      {
        if (k.Value == "System.Storage.Contacts.Primary")
          return smtpEA;
      }
    }
  }
}
```

This property can then be used in a query as follows:

Query<Person>
searcher=wd.Items.Source.OfType<Person>( ).Where ("PrimaryEmailAddress.Address='rameshn@microsoft.com'");
Person person=searcher.GetSingle( ); //Note the GetSingle is being added as a DCR //The property can be projected as follows:

Query<DataRecord> projection= wd.Items.Source.OfType<Person>( ).Select("it.DisplayName, it.PrimaryEmailAddress");

// Enumerate the results foreach (DataRecord records in projection)
{
    string displayName=(string) record["DisplayName"];
    SmtpEmailAddress primaryEmailAddress=(SmtpEmailAddress)
record["PrimaryEmailAddress"];
}

Figure 3:
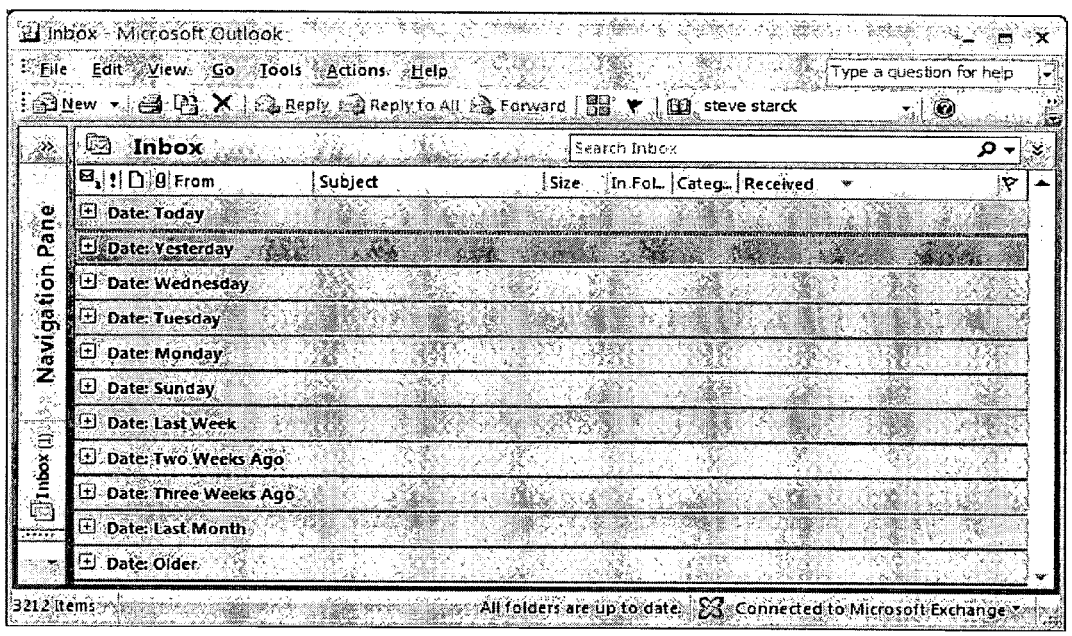
FIG. 3 illustrates an Outlook group by date view similar to a friendly grouping view generated using a calculated method according to the invention.

Notes on eSQL Expression:
  The "this" prefix has to be used to reference other Properties/Methods (mapped or calculated) on the instance.
  The expression is only validated at runtime.
  Any valid eSQL expression can be supplied, including using clauses.
  Calculated Parameters need to be prefixed with @ in order to reference them in the expression 4.2 Calculated Methods Similar to calculated properties, methods defined in partial classes can also be enabled to be usable in eSQL. The System.Data.Objects.CaclulatedAttribute can be added to the method in a similar way to adding it to a property. The following semantics and restrictions apply to calculated methods:
  Generic (e.g. X<T>) methods are currently not supported in eSQL, i.e. the generic type parameter will not be used in the eSQL expression.
  The params C# keyword that allows a variable number of parameters to a method is not supported in calculated methods.
  Polymorphism of calculated methods in currently not supported.
  Currently there is no support for externally defined private or internal calculated methods, i.e the API must have access to the property/method.
  In general recursive calls in calculated methods is not supported.
  Overloading of calculated methods by parameter values (types) is currently not supported.
  The return type of the method must match the type returned by the eSQL expression.
    If the return type of the expression is a nullable type then the method must be declared as returning a nullable type. This constraint is enforced by the infrastructure, and an exception will be thrown.
    If the return type of the expression is a collection then the return type of the method must be of type Query<T>.
  Hiding methods by specifying the new operator is not supported.
  Virtual methods are not supported.
  Methods that return void are not supported
  Method parameters do not require a prefix in order to reference them in the expression The following is an example of using a calculated method. The scenario here is to generate a friendly grouping view similar the Outlook group by date view, as illustrated in FIG. 3.

The following code encapsulates this into a method so that it can be reused elsewhere:

public partial class Message: . . .
{
  //This method returns the employees of an Organization
  //The employer in the expression refers to the method parameter employer
  [Calculated(Expression=@"
  using System.Data.TSql.Date;
  case
  when datediff('hour', this.ReceivedTime, date)<0
    then 'Future'
  when datediff('hour', this.ReceivedTime, date)<24
    then 'Today'
  when datediff('hour', this.ReceivedTime, date) between
    24 and 48
    then 'Yesterday'
  when datediff('hour', this.ReceivedTime, date) between
    48 and (24*(datepart('weekday',date)))
    then datename(weekday,this.ReceivedTime)
  when datediff('hour',this.ReceivedTime, date) between
    (24*(datepart('weekday',date))) and (24*(datepart
    ('weekday',date)))+(7*24)
    then 'Last Week'
  when datediff('hour',this.ReceivedTime, date) between
    (24*(datepart('weekday',date)))+(7*24) and (24*
    (datepart('weekday',date)))+(14*24)
    then 'Two Weeks Ago'
  when datediff('hour',this.ReceivedTime, date) between
    (24*(datepart('weekday',date)))+(14*24) and (24*
    (datepart('weekday',date)))+(21*24)
    then 'Three Weeks Ago'
  when datediff('hour',this.ReceivedTime, date) between
    (24*(datepart('weekday',date)))+(21*24) and (24*
    (datepart('weekday',date)))+(84*24) and datediff
    ('month',this.ReceivedTime,date)<2
    then 'Last Month'
  else 'Older'
  end as RelativeDate")]
  public string GetReceivedTimeName(DateTime date)
```

```
{
    //The implementation of this method would need to do
      similar logic to the expression for consistency
      ...
    }
}
```

This can then be used to group the results as follows:

```
// Create a query over messages to group by the ReceivedTime
Name                                     Query<DataRecord>
projection=context.Items.Source.OfType<Message>( ).Se-
lect("it.Subject, it.GetReceivedTimeName(@date) as Rela-
tiveDate", new QueryParameter("date", DateTime.Now))
.GroupBy("RelativeDate");

// Enumerate the results foreach (DataRecord record in projection)
{
    ...
}
```

4.3 Calculated & CacluatedParameter Attributes

The System.Data.Objects.CalculatedAttribute is defined as follows:

```
namespace System.Data.Objects
{
    [System.AttributeUsage
      (AttributeTargets.Property|AttributeTargets.Method)]
    public class CalculatedAttribute:Attribute
    {
      public string Expression {get; set;}
      public CalculatedAttribute(string expression);
    }
}
```

This attribute defines the following properties:

Expression. The Expression property must contain a valid eSQL expression that projects a value. This value can then be used in another expression. See below for more details on how to specify named parameters in expressions.

The System.Data.Objects.CalculatedParameterAttribute is defined as follows:

```
namespace System.Data.Objects
{
    [AttributeUsage
      (AttributeTargets.Property|AttributeTargets.Method,
      AllowMultiple=true)]
    public class CalculatedParameterAttribute:Attribute
    {
      public string Name {get; set;}
      public object Value {get; set;}
      public CalculatedParameterAttribute( );
    }
}
```

This attribute defines the following properties:

Name. The name of the parameter as referenced in the Expression property of a Calculated Attribute.

Value. The value of the parameter defined by the Name property.

The Named parameters defined in a CalculatedAttribute follow these semantics:
  References to calculated parameters must have an @ prefix
  The order of defining the CalculatedParameterAttribute and CalculatedAttribute does not matter.
  Parameter names must be unique across method parameter names and other named parameters defined by CalculatedParameterAttribute on the method.
  For a calculated property any named parameters in the expression must be defined by CalculatedParameterAttribute.

The following example illustrates the use of the above attribute classes:

```
public partial class Person: ...
{
    //The @year in the expression refers to the named param-
eter year provided by
    //the CalculatedParameterAttribute
    [Calculated(Expression=@"
    using System.Data.TSql.Date;
    (@year-year(this.BirthDate)")]
    [CalculatedParameter(Name="year",
Value=System.DateTime.Year)]
    public int GetRoughAge( )
    { ... }
}
```

What is claimed is:

1. A system for processing an application request for data, comprising:
   a processor;
   an object services layer for accepting a request, wherein the request comprises a collection expression comprising at least table subqueries and expressions in a from clause of a database query expressed in any one of a plurality of application data models and captures data semantics independent of the data stores and deployment tiers for an entity data model comprising a collection of database and non-database data types;
   an object services layer for generalizing queries for collections of database and non-database types using extensions driven from metadata associated with each data type in the collection to create uniform expressions for each data type in the collection;
   a map provider layer that supplies a plurality of mapping transforms for transforming the request into a canonical expression tree representative of a database query and mapping all data from the entity data model, wherein the mapped entity data model comprises an expression for each entity within the collection of database and non-database data types; and
   a bridge layer for converting the canonical expression tree into a modified expression tree and performing data-model compensation, said modified expression tree being adapted to at least one requirement of a first database or a data store;
   wherein said bridge layer is configured to convert the expression tree into any of a plurality of data model capabilities adapted to requirements of any of a plurality of databases and is configured to return a result to said bridge layer.

2. The system of claim 1, wherein the request further comprises a set operation selected from the group comprising union, intersect, and except, wherein said set operation operates on collections.

3. The system of claim 1, wherein the request further comprises a join operation that operates on collections.

4. A processor-implemented method for processing an application request for data, the method comprising:

accepting a request via an object services layer implemented on the processor, wherein the request comprises a set operation selected from the group comprising union, intersect, and except, wherein said set operation operates on collections comprising at least table subqueries and expressions in a from clause of a database query for database and non-database data types to create uniform expressions for each data type in the collection;

generalizing queries for collections of database and non-database types using extensions driven from metadata associated with each data type in the collection to create uniform expressions for each data type in the collection;

supplying, via a map provider layer, a plurality of mapping transforms for transforming the request into a canonical expression tree representative of a database query and mapping all data from an entity data model, wherein the mapped entity data model comprises an expression for each entity within the collection of database and non-database data types; and converting, via a bridge layer, the canonical expression tree into a modified expression tree and performing data-model compensation, said modified expression tree being adapted to at least one requirement of a first database and any of plurality of data stores;

wherein said bridge layer is configured to convert the expression tree into any of a plurality of data model capabilities adapted to requirements of any of a plurality of databases or storage providers and is configured to return a result to said bridge layer.

5. The method of claim 4, wherein the request further comprises a join operation that operates on collections.

6. A computer-readable storage medium comprising computer-executable instructions for processing an application request for data, the computer-executable instructions, when executed by the processor, performing acts of:

accepting a request for a join operation that operates on collections comprising at least table subqueries and expressions in a from clause of a database query expressed in any one of a plurality of application data models and captures data semantics independent of the data stores and deployment tiers for an entity data model comprising a collection of database and non-database data types;

generalizing queries for collections of database and non-database types using extensions driven from metadata associated with each data type in the collection to create uniform expressions for each data type in the collection;

supplying a plurality of mapping transforms for transforming the request into a canonical expression tree representative of a database query and mapping all data from an entity data model, wherein the mapped entity data model comprises an expression for each entity within the collection of database and non-database data types; and converting, via a bridge layer, the canonical expression tree into a modified expression tree and performing data-model compensation, said modified expression tree being adapted to at least one requirement of a first database or any of a plurality of data stores;

wherein said bridge layer is configured to convert the expression tree into any of a plurality of data model capabilities adapted to requirements of any of a plurality of databases and is configured to return a result to said bridge layer.

7. A processor comprising an application configured to request data from a database, wherein said application generates a request according to a query language, said query language comprising at least the following characteristics:

said query language permits use of a collection expression comprising at least table subqueries and expressions in a from clause of a database query expressed in any one of a plurality of application data models and captures data semantics independent of the data stores and deployment tiers for an entity data model comprising a collection of database and non-database data types;

said query language permits use of an object services layer for generalizing queries for collections of database and non-database types using extensions driven from metadata associated with each data type in the collection to create uniform expressions for each data type in the collection;

said query language initiates a map provider layer that supplies a plurality of mapping transforms for transforming the collection expression into a canonical expression tree representative of a database query;

said query language permits use of a set operation selected from the group comprising union, intersect, and except, wherein said set operation operates on collections by providing a syntactic operator to allow projection of an expression from a collection comprising at least table subqueries and expressions in a from clause of a database query for database and non-database data types and creating uniform expressions for each data type in the collection; and said query language permits use of a join operation that operates on collections and mapping all data from an entity data model, wherein the mapped entity data model comprises an expression for each entity within the collection comprising database and non-database data types.

8. The processor of claim 7, said query language further requiring every query to comprise at least one expression.

9. The processor of claim 8, wherein each expression has an uniform interpretation that does not depend on the context in which it is used.

10. The processor of claim 7, said query language further permitting use of the following expressions:
1+2*3
"abc"
row(1 as a, 2 as b)
{1, 3, 5}
e1 union all e2
distinct(e1).

11. The processor of claim 7, wherein said query language considers all subqueries to be multiset subqueries.

12. The processor of claim 7, wherein if a scalar value is desired from a subquery, said query language requires said application to provide an element operator that operates on a collection.

13. The processor of claim 7, said query language further permitting use of an element operator to extract a singleton value from a collection, and a select value clause to avoid creating a row-wrapper during a query expression.

14. The processor of claim 7, said query language further permitting use of a select value clause to skip an implicit row construction.

15. The processor of claim 7, said query language further permitting use of a row constructor to construct arbitrary rows such that a select value row (e1, e2, . . . ) statement is exactly equivalent to the statement select e1, e2, . . . .

16. The processor of claim 7, said query language further permitting use of a query expression that generalizes left-correlations in the from-clause and treats them uniformly.

17. The processor of claim 7, said query language requiring all column references to be qualified with a table alias.

18. The processor of claim 7, said query language further permitting use of a syntactic shortcut to handle navigation through a collection, wherein the shortcut uses the .. operator to allow projection of an expression from a collection, such that "a..b" is the equivalent of "select value t.b from a as t".

19. The processor of claim 7, said query language further permitting use of aliasing of group-by keys, and left-correlations among such keys.

20. The processor of claim 7, said query language further permitting use of two kinds of aggregates, a collection-based aggregate that operates on collections, and produces an aggregated result, and a Structured Query Language (SQL) style aggregate, wherein said mechanism implicitly converts SQL style aggregates into collection-based aggregates.

21. The processor of claim 7, said query language further permitting use of an INSERT..VALUES statement, and said statement not allowing a column list to be specified in said INSERT..VALUES statement.

\* \* \* \* \*